US012412056B2

(12) United States Patent
Zagaynov et al.

(10) Patent No.: US 12,412,056 B2
(45) Date of Patent: *Sep. 9, 2025

(54) DECODING OF TWO-DIMENSIONAL BARCODES UNDER UNFAVORABLE CONDITIONS

(71) Applicant: ABBYY Development Inc., Dover, DE (US)

(72) Inventors: Ivan Zagaynov, Dolgoprudniy (RU); Dmitry Zvonarev, Sarapul (RU); Aleksandr Riashchikov, Samara (RU)

(73) Assignee: ABBYY Development Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,802

(22) Filed: Apr. 15, 2024

(65) Prior Publication Data
US 2024/0256809 A1    Aug. 1, 2024

Related U.S. Application Data

(63) Continuation of application No. 17/745,026, filed on May 16, 2022, now Pat. No. 11,960,966.

(51) Int. Cl.
G06K 7/14    (2006.01)
G06K 19/06    (2006.01)
G06T 7/60    (2017.01)

(52) U.S. Cl.
CPC ..... *G06K 7/1417* (2013.01); *G06K 19/06028* (2013.01); *G06T 7/60* (2013.01);
(Continued)

(58) Field of Classification Search
CPC .. G06K 7/1417; G06K 19/06028; G06T 7/60; G06T 2207/20081; G06T 7/1413; G06T 7/1443
See application file for complete search history.

(56) References Cited

U.S. PATENT DOCUMENTS 10,198,648 B1    2/2019    Bradley et al.
10,699,089 B2    6/2020    Bachelder et al.
(Continued)

FOREIGN PATENT DOCUMENTS

CN    104200188 A    12/2014
CN    107908996 A    4/2018
CN    109886059 A    6/2019

OTHER PUBLICATIONS

Chou T-H., et al., "QR Code Detection using Convolutional Neural Networks," 2015 International Conference on Advanced Robotics and Intelligent Systems (ARIS), Taipei, Taiwan, 2015, 5 Pages, DOI: 10.1109/ARIS.2015.7158354.

(Continued)

*Primary Examiner* — Matthew Mikels
(74) *Attorney, Agent, or Firm* — Lowenstein Sandler LLP

(57) ABSTRACT

Aspects and implementations provide for mechanisms of detection and decoding of barcodes in images. The disclosed techniques include estimating dimensions of a module of a barcode based on geometric characteristics of a barcode image, forming hypotheses that group modules into barcode symbols, and assessing viability of formed hypotheses. Various operations of the techniques may involve the use of neural networks, including estimation of module dimensions and assessment of groupings of modules into lines and lines into barcode symbols. The techniques may be used for decoding of barcodes captured in images of unfavorable conditions, including blur, perspective, sub-optimal lighting, barcode deformation, and the like. The techniques may be applied to decoding linear one-dimensional barcodes, two-dimensional barcodes, and stacked linear barcodes.

20 Claims, 21 Drawing Sheets

(52) U.S. Cl.
CPC ............... *G06T 2207/20081* (2013.01); *G06T 2207/20084* (2013.01)

(56) References Cited

U.S. PATENT DOCUMENTS

| | | | |
|---|---|---|---|
| 11,960,966 B2* | 4/2024 | Zagaynov | ............ G06K 7/1413 |
| 2019/0244043 A1 | 8/2019 | Bradley et al. | |

OTHER PUBLICATIONS

Katona M., et al., "Distance Transform and Template Matching Based Methods for Localization of Barcodes and QR Codes," Computer Science and Information Systems, Sep. 10, 2019, vol. 17 (1), pp. 161-179.

Machine Translation of CN111783494B, Year 2022.

Svarnovics V., "DataMatrix Barcode Read Rate Improvement Using Image Enhancement," Department of Computer Vision and Biometrics, University of Twente, 2021, pp. 1-13.

Wudhikarn R., et al., "Deep Learning in Barcode Recognition: A Systematic Literature Review", IEEE Access, Jan. 13, 2022, vol. 10, pp. 8049-8072.

Zhao Q., et al., "Deep Dual Pyramid Network for Barcode Segmentation Using Barcode-30k Database," Jul. 31, 2018, pp. 1-13.

* cited by examiner

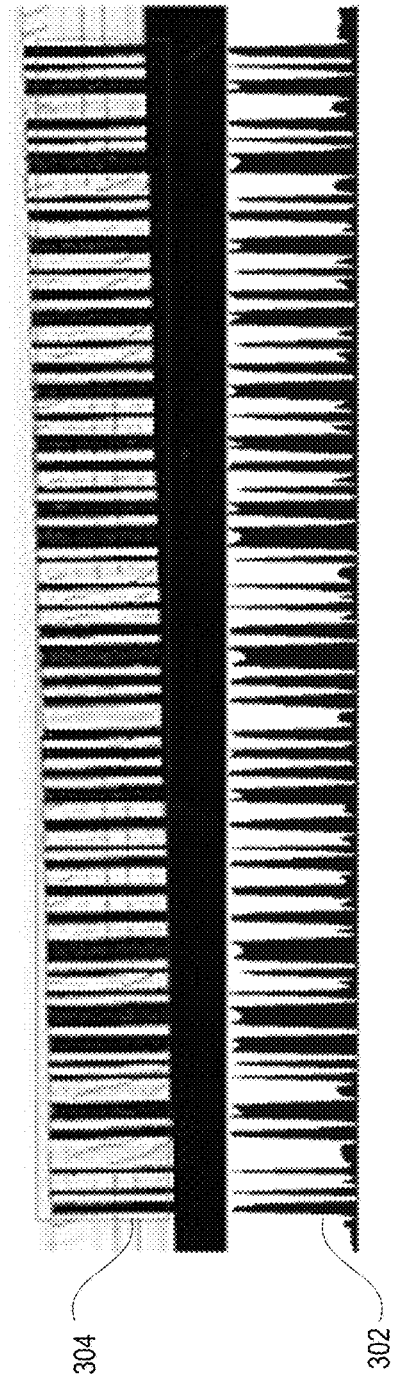
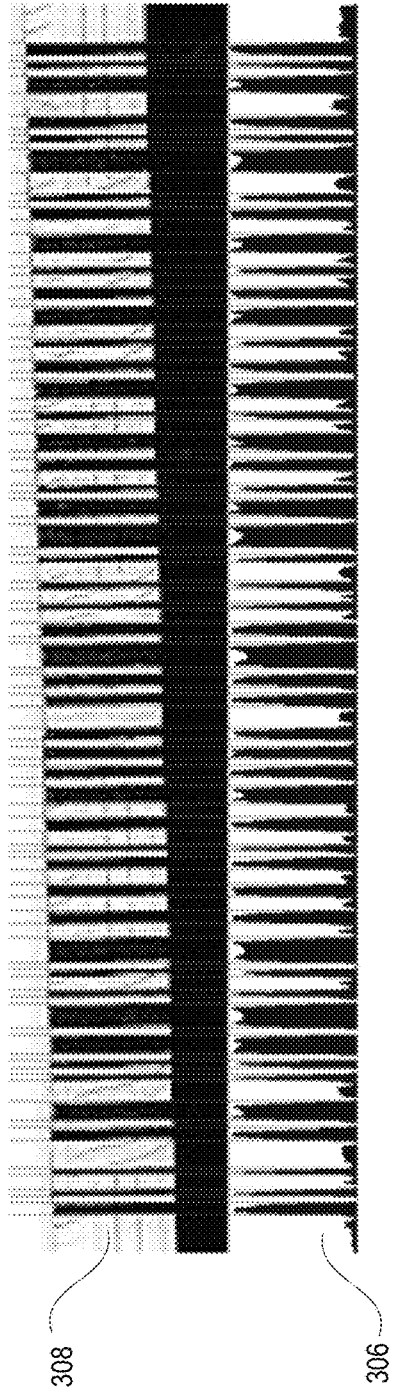
FIG. 3A
FIG. 3B

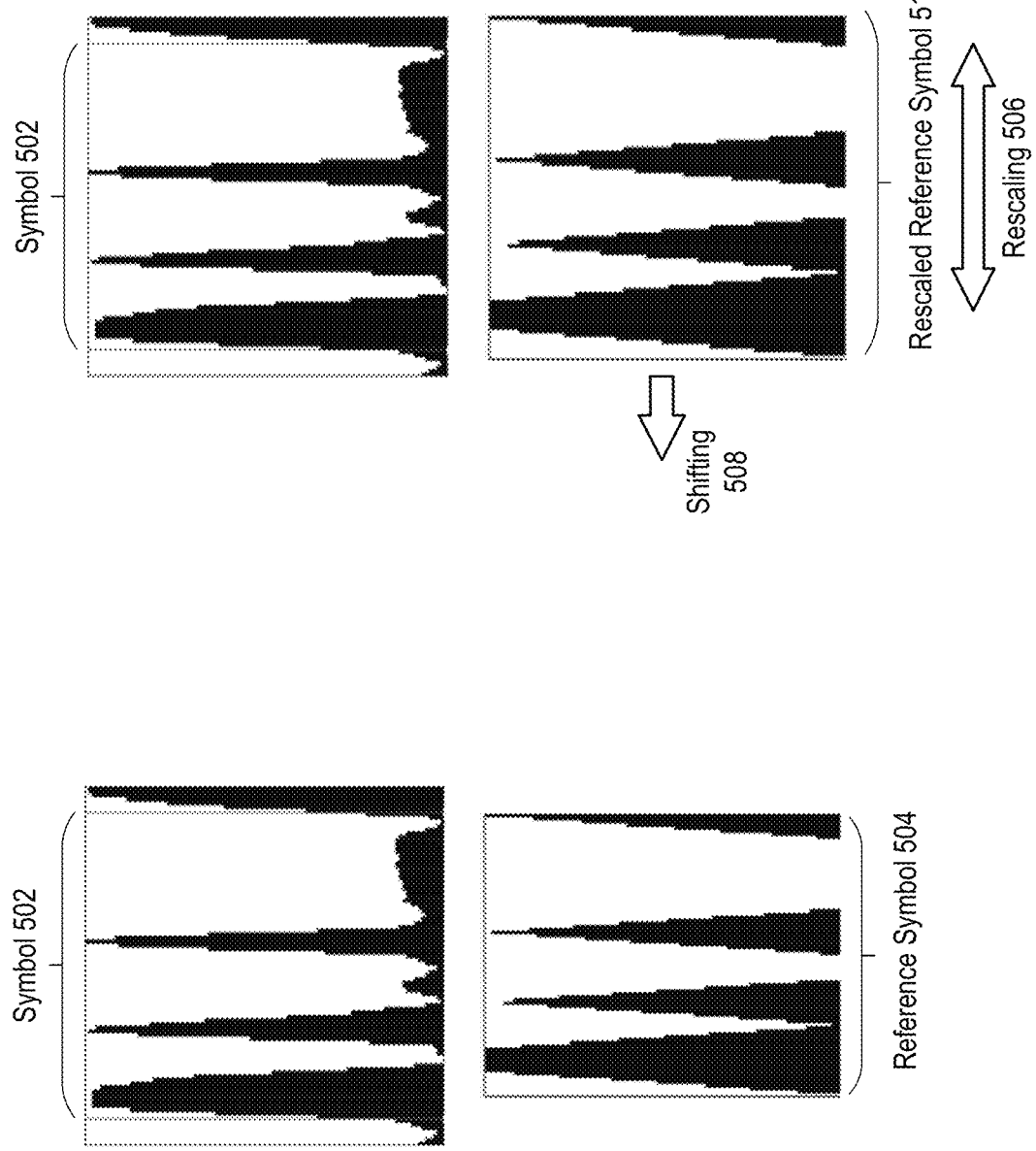

DECODING OF TWO-DIMENSIONAL BARCODES UNDER UNFAVORABLE CONDITIONS

TECHNICAL FIELD

This application is a continuation application of co-pending U.S. patent application Ser. No. 17/745,026, entitled "DECODING OF TWO-DIMENSIONAL BARCODES UNDER UNFAVORABLE CONDITIONS," filed May 16, 2022, the entire contents of which are incorporated herein by reference.

TECHNICAL FIELD

The implementations of the disclosure relate generally to computer systems and, more specifically, to systems and methods for detecting and decoding multiple types of barcodes that may be captured in images with varying, and often suboptimal, quality.

BACKGROUND

Barcodes contain encoded messages that are often placed on various products, product packaging, product advertising, product shipping labels, and the like. Messages in barcodes are encoded via a series of lines of varying width (one-dimensional or 1D barcodes) or a series of planar shapes (two-dimensional or 2D barcodes). Linear 1D barcodes typically encode a limited amount of (often numerical) information whereas 2D barcodes can encode larger amounts of data (numbers and/or letters/glyphs/etc.) since both dimensions (e.g., vertical and horizontal) can be used for storing a greater variety and quantity of barcode symbols.

SUMMARY OF THE DISCLOSURE

Implementations of the present are directed to barcode decoding techniques that are resilient under unfavorable conditions, including barcode images of reduced quality, perspective distortions, missing and/or obscured barcode symbols, sub-optimal lighting (e.g., low light or glare) conditions, and so on. The disclosed techniques apply to multiple types of barcodes, including various one-dimensional (linear) and two-dimensional (matrix or stacked linear) barcodes.

In one implementation, a method of the disclosure includes obtaining a histogram of pixel intensities for a barcode image (BI), the histogram comprising a plurality of intensity values, each of the plurality of intensity values characterizing an appearance of a pixel column of a plurality of pixel columns of the BI. The method further includes identifying, based on the histogram, a plurality of lines of the BI, and generating one or more hypotheses, wherein each of the one or more hypotheses groups the plurality of lines into a plurality of candidate symbols. The method further includes determining, for at least a subset of the one or more hypotheses, a plurality of similarity factors (SFs), wherein each SF characterizes similarity of a respective candidate symbol of the plurality of candidate symbols to one of a set of barcode reference symbols, and an aggregated SF, wherein the aggregated SF is determined in view of the plurality of SFs. The method further includes selecting, in view of the aggregated SFs determined for the subset of the one or more hypotheses, a preferred hypothesis and decoding the BI using the preferred hypothesis.

In another implementation, a system of the disclosure includes a memory and a processing device operatively coupled to the memory. The processing device is to obtain a histogram of pixel intensities for a BI, the histogram comprising a plurality of intensity values, each of the plurality of intensity values characterizing an appearance of a pixel column of a plurality of pixel columns of the BI. The processing device is further to identify, based on the histogram, a plurality of lines of the BI and generate one or more hypotheses, wherein each of the one or more hypotheses groups the plurality of lines into a plurality of candidate symbols. The processing device is further to determine, for at least a subset of the one or more hypotheses, a plurality of SFs, wherein each SF characterizes similarity of a respective candidate symbol of the plurality of candidate symbols to one of a set of barcode reference symbols, and an aggregated SF, wherein the aggregated SF is determined in view of the plurality of SFs. The processing device is further to select, in view of the aggregated SFs determined for the subset of the one or more hypotheses, a preferred hypothesis and decode the BI using the preferred hypothesis.

In another implementation, a non-transitory machine-readable storage medium of the disclosure includes instructions that, when accessed by a processing device, cause the processing device to obtain a histogram of pixel intensities for a BI, the histogram comprising a plurality of intensity values, each of the plurality of intensity values characterizing an appearance of a pixel column of a plurality of pixel columns of the BI. The instructions are further to cause the processing device to identify, based on the histogram, a plurality of lines of the BI and generate one or more hypotheses, wherein each of the one or more hypotheses groups the plurality of lines into a plurality of candidate symbols. The instructions are further to cause the processing device to determine, for at least a subset of the one or more hypotheses, a plurality of SFs, wherein each SF characterizes similarity of a respective candidate symbol of the plurality of candidate symbols to one of a set of barcode reference symbols, and an aggregated SF, wherein the aggregated SF is determined in view of the plurality of SFs. The instructions are further to cause the processing device to select, in view of the aggregated SFs determined for the subset of the one or more hypotheses, a preferred hypothesis and decode the BI using the preferred hypothesis.

In another implementation, a method of the disclosure includes estimating a module size of a BI based on geometric characteristics of a plurality of pixel groups, each of the plurality of pixel groups comprising one or more connected pixels of a first color. The method further includes rescaling the BI based on the estimated module size and processing the rescaled BI using a neural network (NN) to obtain candidate locations of modules in the BI and a map of binarized pixel intensities of the BI. The method further includes identifying associations of grid positions in a grid of modules (GoM) with the candidate locations of modules in the BI, wherein an association of each of at least a subset of the grid positions in the GoM is identified based on one or more associations identified for other grid positions in the GoM. The method further includes decoding the BI, using the GoM and the map of binarized pixel intensities.

In another implementation, a method of the disclosure includes obtaining a BI of a stacked linear barcode comprising symbols arranged in a plurality of columns and a plurality of rows, wherein each symbol comprises a fixed number of modules, and estimating, based on geometric characteristics of the BI, a module width and a module height. The method further includes processing, in view of the module height, the BI using a first NN to obtain a mask of rows, wherein the mask of rows characterizes spatial arrangement of the plurality of rows in the BI. The method further includes modifying, using the mask of rows, horizontal alignment of one or more rows of the plurality of rows of the BI to obtain a realigned BI. The method further includes processing, in view of the module width, the realigned BI to identify the symbols of the BI, wherein each symbol of the BI is identified using a plurality of aggregated probabilities, each of the plurality of aggregated probabilities characterizing a likelihood that a reference symbol of a plurality of reference symbols matches a respective symbol of the BI, and decoding the BI using the identified symbols of the BI.

In another implementation, a system of the disclosure includes a memory and a processing device operatively coupled to the memory. The processing device is to estimate a module size of a first BI based on geometric characteristics of a plurality of pixel groups, each of the plurality of pixel groups comprising one or more connected pixels of a first color. The processing device is further to rescale the first BI based on the estimated module size and process the rescaled first BI using a first NN to obtain candidate locations of modules in the first BI and a map of binarized pixel intensities of the first BI. The processing device is further to identify associations of grid positions in a grid of modules (GoM) with the candidate locations of modules in the first BI, wherein an association of each of at least a subset of the grid positions in the GoM is identified based on one or more associations identified for other grid positions in the GoM, and decode the first BI, using the GoM and the map of binarized pixel intensities.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 3A illustrates construction of an intensity histogram of a linear barcode image, in accordance with some implementations of the present disclosure.

FIG. 3B illustrates determination of barcode lines based on the intensity histogram of FIG. 3A, in accordance with some implementations of the present disclosure.

FIGS. 5A-B illustrate symbol-based validation of hypotheses during processing of images of one-dimensional barcodes, in accordance with some implementations of the present disclosure.

DETAILED DESCRIPTION

Figure 1:
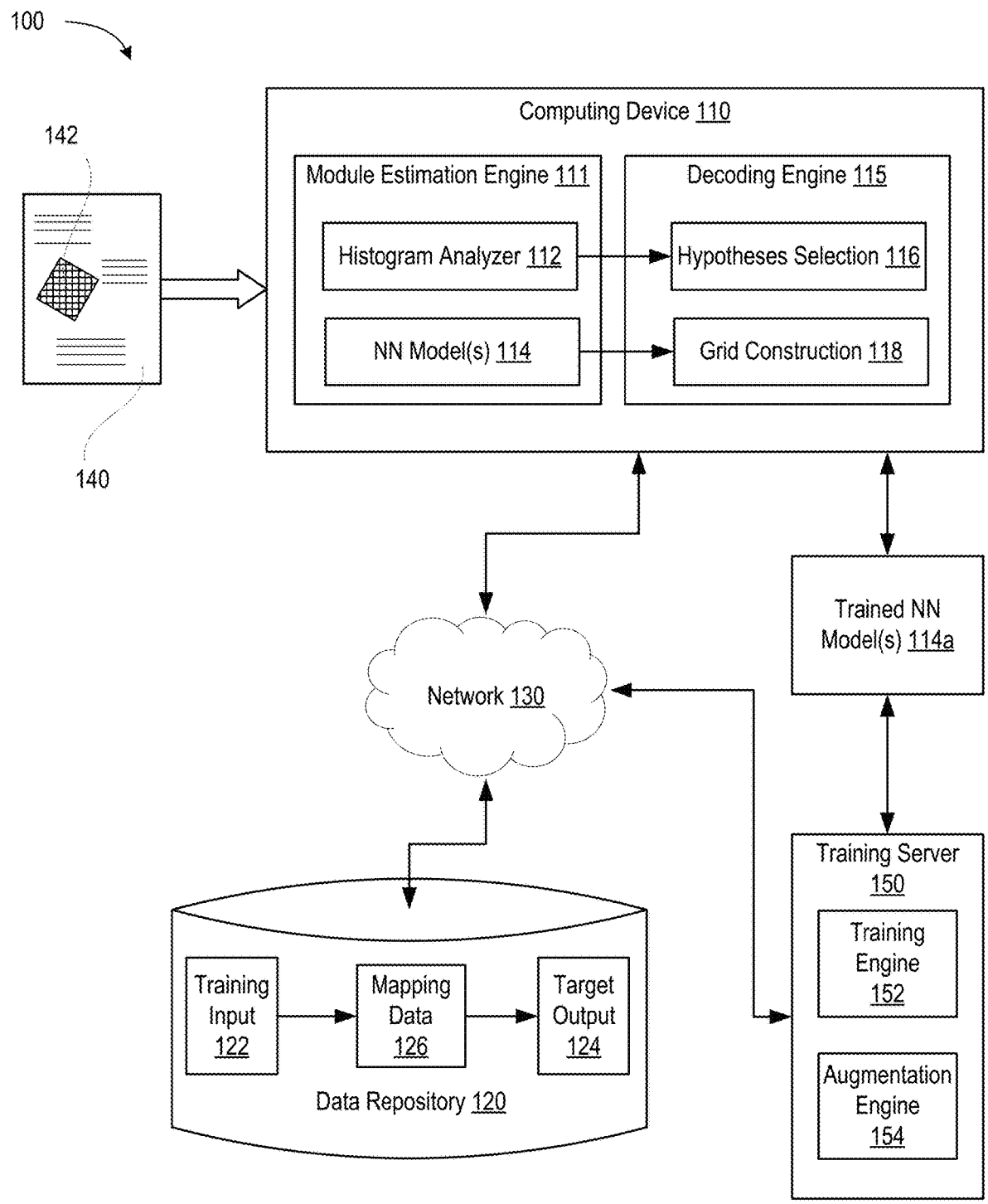
FIG. 1 is a block diagram of an example computer system in which implementations of the disclosure may operate.

Information is typically encoded in barcodes by assigning to a unit of information (a number or a letter) a certain sequence of modules, which may be lines (in 1D barcodes) or squares/rectangles (in 2D barcodes) of the smallest size. For example, in EAN-8 and EAN-13 1D barcodes, the module size is 0.33 mm, with each digit encoded via a symbol having a certain number of modules (module lines). For example, in EAN-8, digit 0 may be encoded as a black line of 3-module width followed by a white line of 2-module width and then followed by 1-module black line and 1-module white line (the 1110010 symbol). Digit 5 may be encoded as (1001110), and so on. Same digits may have multiple symbol encodings depending on the location of the digit within the barcode. For example, digit 5 may also be encoded as the inverted 0110001 symbol or as the 0111001 symbol, depending on the exact location of the digit within the barcode. While EAN-8 (EAN-13) barcodes can encode eight (thirteen) digits, numerous other barcodes are also in use, which may encode a longer strings of numerals or letters, such as the UPC family of barcodes (e.g., UPC-A and UPC-E), Codabar, Code 128 (UPC/EAN-128), and so on. In 2D dimensional barcodes, such as QR, Data Matrix, Aztec, and the like, a module is often a square; any number of modules can be joined into a cluster (group) of modules, with a certain number of information-encoding clusters distributed over the area of a barcode.

Each linear or square module can potentially belong to multiple symbols. Accordingly, to distribute modules among symbols in an unambiguous way, various reference patterns can be used. For example, 1D barcodes typically have quiet zones at both edges of a barcode, to facilitate disambiguation of lines. More specifically, having detected a quiet zone at one edge of the barcode, a barcode reader can associate (in the instance of EAN-8 barcode) the first 7 modules with a first digit, the next 7 modules with a second digit, and so on, resulting in a straightforward decoding. Similarly, 2D barcodes use recognizable patterns to inform a barcode reader about orientation of the barcode and the size of the module. For example, QR barcodes have a finder pattern that has three squares of the size of 7×7 modules, which determine a correct orientation of the barcode (the missing fourth square should be at the bottom right corner of the barcode). QR barcodes can further have a timing pattern of alternating black and white modules, to help a barcode reader to identify the size of the module square. Other types of barcode can have different patterns, e.g., Data Matrix barcodes have an L-shaped finder pattern of black modules along the left side and the bottom side of a barcode and the timing pattern of alternating black and white modules along the right side and the top side.

Under optimal conditions, quiet zones (in 1D barcodes) and finder/timing patterns (in 2D barcodes) are capable of facilitating efficient decoding of messages encoded in the barcodes. However, in many instances, scanned images of barcodes have insufficient quality for the traditional decoding algorithms to work. For example, a 1D barcode can be placed too close to an extraneous line in a document or product packaging, which can result in an incorrect grouping of lines into barcode symbols. An image of a barcode can be acquired with a perspective (when the plane of the barcode is not parallel to a focal plane of a scanner or camera) resulting in the size of a module varying across the barcode image. Some lines/groups of modules can be missing (e.g., due to glare or other artifacts reducing image quality). A barcode can be affixed to a curved surface, which can result in the grid of modules deviating from a regular linear or a square grid leading to misidentification of modules as belonging to incorrect positions within the barcode. A barcode image can further suffer from a motion blur, defocus, and other artifacts. A barcode can be re-captured from another image (e.g., from a computer screen), which can further reduce barcode image quality. Any other number of imperfections of barcode images can be detrimental or even fatal for the traditional techniques of barcode decoding.

Aspects of the present disclosure address the above noted and other deficiencies of the existing technology by providing for systems and techniques for efficient decoding of barcodes that are robust against unfavorable conditions. In one implementation, techniques for decoding of 1D barcodes may include binarization of a barcode image to identify black and white lines of the barcode, followed by estimating the size (width) of the module. One or more hypotheses may then be constructed that specify how various module lines are grouped into hypothesized barcode symbols. Each hypothesis may include a starting module line and an end module line for various hypothesized symbols (which may have different width, to account for a possible perspective distortion). Each symbol may then be compared to an ideal reference symbol (specific for a given barcode type), appropriately rescaled to estimate a similarity factor for the hypothesized symbol, which quantifies how well the hypothesized symbol matches the reference symbol and, therefore, how likely the underlying set of lines is to correspond to the respective reference symbol. Similarity factors of individual hypothesized symbols may then be used to determine aggregated similarity factors for the whole hypothesis. A most likely hypothesis may then be selected based on the similarity factors of different hypotheses and used to decode the barcode.

In another implementation, the techniques for decoding 2D barcodes may include processing a barcode image using a neural network model to identify an intensity map (e.g., a binarized, black/white, map) of the barcode images and locations of module squares, e.g., a set of coordinates $\{x_j, y_j\}$ of approximate centers of the modules and an intensity map $I(x_j, y_j)$ for the modules, with the intensity having two possible values I=0 (black pixel) and I=1 (white pixel), centered at points $x_j$, $y_j$. The map $\{x_j, y_j\}$, in general, does not represent a regular square grid $\vec{r}$=(na, ma) of points on a lattice (n, m=0, 1, 2 . . . ) with a well-defined spacing a (module size), as the set $\{x_j, y_j\}$ may have distortions, missing or extra modules, and so on. A regular (e.g., square or rectangular) grid of modules may then be constructed by mapping the set $\{x_j, y_j\}$ to a regular lattice, e.g., by walking the set $\{x_j, y_j\}$ and incrementally assigning neighboring points $x_j$, $y_j$ to appropriate grid positions. In some implementations, the grid positions may be identified using a suitable local greedy algorithm, as described in more detail below. The constructed grid may have missing sites, multiple modules assigned to a single grid site, the grid may be extending too far (e.g., capturing areas adjacent to the barcode that do not belong to the barcode), and so on. The grid may then be adjusted by trimming extra modules, adding missing modules (e.g., by padding the grid with additional black or white modules), reorienting the grid if the barcode image is not taken at a correct angle. Misidentified modules or modules added with incorrect colors (black instead of white or vice versa) may be corrected using error correction portions of the barcode and the output used to decode the barcode.

In yet another implementation, the techniques for decoding stacked linear barcodes (e.g., PDF417 barcodes, etc.) may include processing the barcode image using a neural network model to classify lines of various rows of the barcode over a number of classes associated with specific module widths, e.g., one module, two modules, etc. Prior to using the neural network, decoding techniques may include estimating a module width of a rectangular module based on a width of one or more symbols of the barcode obtained after improving a vertical perspective of the barcode. The height of the rectangular module may be estimated based on a histogram of length of vertical pixel lines. The width and the height of a module may be used to rescale the barcode image to adjust the size of each module to a module size that was used in training of the neural network model. The lines classified over various widths may then be used to construct various candidate symbols that may be compared with known reference symbols of the barcode type (e.g., PDF417 barcode type). Classification probabilities generated by the neural network model may then be used to select the most likely symbols and to decode the data contained in the barcode image.

The advantages of the disclosed techniques include but are not limited to efficient decoding of messages contained in barcodes that are resilient against adverse conditions. The adverse conditions can include image blur, motion blur, glare (e.g., from a camera flashlight), large angle of capture distortions, crowded environment (e.g., barcode imprinted in a document), missing and spurious lines and patches, deformation of the barcode, reduced resolution in the image-of-an-image scenarios, and the like. Reliability of barcode detection and decoding improves efficiency of various information processing, provides a speedy up access to relevant and sensitive information, protects products against counterfeit copying, improves delivery of interactive advertising information, and provides numerous other benefits.

As used herein, "barcode image" may refer to any image that includes a barcode and is accessible to a computing system. The image may be a scanned image, a photographed image, or any other representation of a document, a product, a packaging, a restaurant menu, or any picture, snapshot, or a video with a barcode superimposed or integrated therein, etc., that is capable of being converted into a data form accessible to a computer. In accordance with various implementations of the present disclosure, an image may conform to any suitable electronic file format, such as PDF, DOC, ODT, JPEG, etc. Although the image may be represented in an electronic (e.g., digital) file format, it is not presumed that modules (e.g., lines, squares, etc.) of the barcode are electronically partitioned into a correct regular grid of modules amenable to standard decoding procedures.

"Document" may represent a financial document, a legal document, a government form, a shipping label, a purchasing order, an invoice, a credit application, a patent document or form, contracts, bills, bills of lading, receipts, accounting documents, commercial or governmental reports, or any other document that may have one or more barcodes of interest. "Document" may represent any document that is printed, typed, or handwritten (for example, by filling out a standard form), sealed, signed, and so one and, in addition to one or more barcodes may have a variety of text fields (containing numerals, numbers, letters, words, sentences, etc.), graphics fields (e.g., logos or any other images), tables (having any number of rows, columns, cells), and so on. A document may have multiple barcodes, e.g., a shipping label barcode, a barcode used for internal docketing by the issuing organization, a barcode for governmental tracking of the document, and so on.

The techniques described herein may involve training neural networks to process barcodes, e.g., to identify a set of modules and associated intensity maps, probability maps, etc., that may be output using different channels (classification heads) processing outputs of the same backbone network. The neural network(s) may be trained on a training dataset of real barcode images and/or synthetic barcode images that include known barcodes whose depictions have one or more defects or imperfections described above. During training, a neural network may generate a training output for each training input. The training output of the neural network may be compared with a desired target output as specified by the training data set, and the error may be propagated back to the previous layers of the neural network, whose parameters (e.g., the weights and biases of the neurons) may be adjusted accordingly (e.g., using a suitable loss function) to optimize prediction accuracy. A trained neural network may be applied for efficient and robust detection and decoding of barcodes of various types on any appropriate images.

FIG. 1 is a block diagram of an example computer system 100 in which implementations of the disclosure may operate. As illustrated, computer system 100 may include a computing device 110, a data repository 120, and a training server 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some implementations, the computing device 110 may be (and/or include) one or more computer systems 2100 of FIG. 21.

Computing device 110 may receive a barcode image 142. Barcode image 142 may be included as part of a larger image 140 that may also include any suitable text(s), graphics, table(s), and the like. Image 140 may be received in any suitable manner. For example, computing device 110 may receive a digital copy of image 140 by scanning or photographing a document, an object, a scenery, a view, and so on. Additionally, in those instances where the computing device 110 is a server, a client device connected to the server via the network 130 may upload a digital copy of image 140 to the server. In instances where the computing device 110 is a client device connected to a server via the network 130, the client device may download image 140 from the server or from data repository 120.

Image 140 may be pre-processed to detect barcode image 142. Preprocessing may identify location of barcode image 142 (or multiple barcode images) within image 140, as well as the orientation of barcode image 142, e.g., the directions of main axes of the barcode. Preprocessing may further crop barcode image 142 prior to providing barcode image 142 for decoding (data extraction). Detection and cropping of barcode image 142 may be performed using any known methods. For example, detection may be performed by covering image 140 with patches, identifying patches that cover at least a portion of barcode image 142, and merging identified patches to obtain barcode image 142, e.g., as described in the U.S. patent publication 2019/0384954 "Detecting barcodes on images," which is incorporated by reference herein.

Identification of patches may include processing the patches via a suitably trained neural network model. Image 140 and/or extracted barcode image 142 may additionally be filtered, de-noised, enhanced, normalized, rescaled, de-blurred, and the like.

During training of neural network models, barcode image(s) 142 may be appropriately prepared. For instance, barcode image(s) 142 may be manually or automatically annotated. Barcode image 142 may be a base image used to generate multiple training images by augmenting a base image with one or more imperfections. Specifically, in one implementation, computing device 110 may include an augmentation engine (e.g., augmentation engine 154) that can be used to remove modules from the base image, add modules to the base image, smudge modules in the base image, distort the base image, apply a projective transformation to add perspective to the base image, and so on.

Computing device 110 may include a module estimation engine 111, to identify the likely sizes and locations of modules in barcode image 142, and a decoding engine 115, to identify data encoded in barcode images using the identified modules. For example, during processing of 1D barcode images, a histogram analyzer 112 may identify boundaries between black and white lines, and may further estimate the size of a line module. The identified lines may then be grouped into barcode symbols, each grouping constituting a particular hypothesis reflecting a specific piece of information encoded in barcode image 142. A hypotheses selection 116 may discard hypotheses that include groupings having no viable barcode symbols and may select the most likely hypothesis, as described in more detail below. During processing of 2D barcode images, one or more neural network (NN) models 114 may identify likely locations and intensities of individual (square) modules and a grid construction 118 may determine the most probable grid of modules of barcode image 142, as described in more detail below. It should be understood that computing device 110 may include other components and engines that are not explicitly shown in FIG. 1, and which may perform various other processing described in conjunction with various figures below.

Module estimation engine 111 and decoding engine 115 may include (or may have access to) instructions stored on one or more tangible, machine-readable storage media of computing device 110 and executable by one or more processing devices of computing device 110. In one implementation, module estimation engine 111 and decoding engine 115 may be implemented as a single component. Module estimation engine 111 and decoding engine 115 may each be a client-based application or may be a combination of a client component and a server component. In some implementations, module estimation engine 111 and decoding engine 115 may be executed entirely on the client computing device such as a server computer, a desktop computer, a tablet computer, a smart phone, a notebook computer, a camera, a video camera, or the like. Alternatively, some portion of module estimation engine 111 and decoding engine 115 may be executed on a client computing device (which may receive image 140 and/or barcode image 142) while another portion of module estimation engine 111 and decoding engine 115 may be executed on a server device that performs ultimate decoding of barcode data. The server portion may then communicate the decoded barcode data to the client computing device, for further usage and/or storage. Alternatively, the server portion may provide the data to another application. In other implementations, module estimation engine 111 and decoding engine 115 may execute on a server device as an Internet-enabled application accessible via a browser interface. The server device may be represented by one or more computer systems such as one or more server machines, workstations, mainframe machines, personal computers (PCs), etc.

A training server 150 may construct NN models 114*a* (or other machine learning models) and train NN models 114*a* to estimate module sizes, characteristics, and distributions of modules within barcode image 142. Training server 150 may include a training engine 152 that performs training of NN models 114*a*. Training server 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The NN model(s) 114*a* may be trained to segment barcode image(s) 142 into sets of (1D or 2D) modules.

The NN model(s) 114*a* may be trained by the training engine 152 using training data that includes training inputs 122 and corresponding target outputs 124 (correct classifications for the respective training inputs 122). The training engine 152 may find patterns in the training data that map the training inputs to the target outputs (the desired result to be predicted), and train NN model(s) 114*a* to capture these patterns. As described in more detail below, NN model(s) 114*a* may include deep neural networks, with one or more hidden layers, e.g., convolutional neural networks, recurrent neural networks (RNN), and fully connected neural networks. The training data may be stored in data repository 120 and may also include mapping data 126 that maps training inputs 122 to target outputs 124. Target outputs 124 may include identification of the grid of modules and corresponding intensities (colors) of the modules, types of barcodes (e.g., EAN, UPC, QR, etc.), data encoded in barcodes of training inputs 122. During the training phase, training engine 152 may find patterns in the training data that can be used to map the training inputs to the target outputs. The patterns can be subsequently used by NN model(s) 114*a* for future predictions (inferences).

Training engine 152 (located on the training server 150) may operate in combination with an augmentation engine 154. For example, a developer may have access to base barcode images. Augmentation engine 154 may modify a base barcode image with one or more imperfections and provide the modified barcode images (as training data) to data repository 120 where it can be accessed by training engine 152.

Data repository 120 may be a persistent storage capable of storing files as well as data structures to perform barcode detection and decoding, in accordance with implementations of the present disclosure. Data repository 120 be hosted by one or more storage devices, such as main memory, magnetic or optical storage disks, tapes, or hard drives, network-attached storage (NAS), storage area network (SAN), and so forth. Although depicted as separate from the computing device 110, data repository 120 may be part of computing device 110. In some implementations, data repository 120 may be a network-attached file server, while in other implementations data repository 120 may be some other type of persistent storage such as an object-oriented database, a relational database, and so forth, that may be hosted by a server machine or one or more different machines coupled to the via the network 130.

In some implementations, training engine 152 may train NN model(s) 114*a* that include multiple neurons to perform barcode detection and decoding, in accordance with some implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from different layers may be connected by weighted edges. The edge weights are defined at the network training stage based on a training dataset that includes a plurality of images with known barcodes. In one illustrative example, all the edge weights may be initially assigned some random values. For every training input 122 in the training dataset, training engine 152 may compare observed output of the neural network with the target output 124 specified by the training data set. The resulting error—the difference between the output of the neural network and the target output may be propagated back through the layers of the neural network, and the weights may be adjusted in the way that makes observed outputs closer to target outputs 124. This adjustment may be repeated until the error for a particular training input 122 satisfies a predetermined condition (e.g., falls below a predetermined error). Subsequently, a different training input 122 may be selected, a new output may be generated, and a new series of adjustments may be implemented, and so on, until the neural network is trained to a sufficient degree of accuracy. In some implementations, this training method may be applied to training one or more artificial neural networks illustrated in FIG. 8, FIG. 10, and FIG. 14.

After NN model(s) 114*a* are trained, the set of NN model(s) 114*a* may be provided to computing device 110 for inference analysis of new barcode images. For example, computing device 110 may input a new barcode image into the provided NN model(s) 114 and may extract data stored in the new barcode images.

Figure 2:
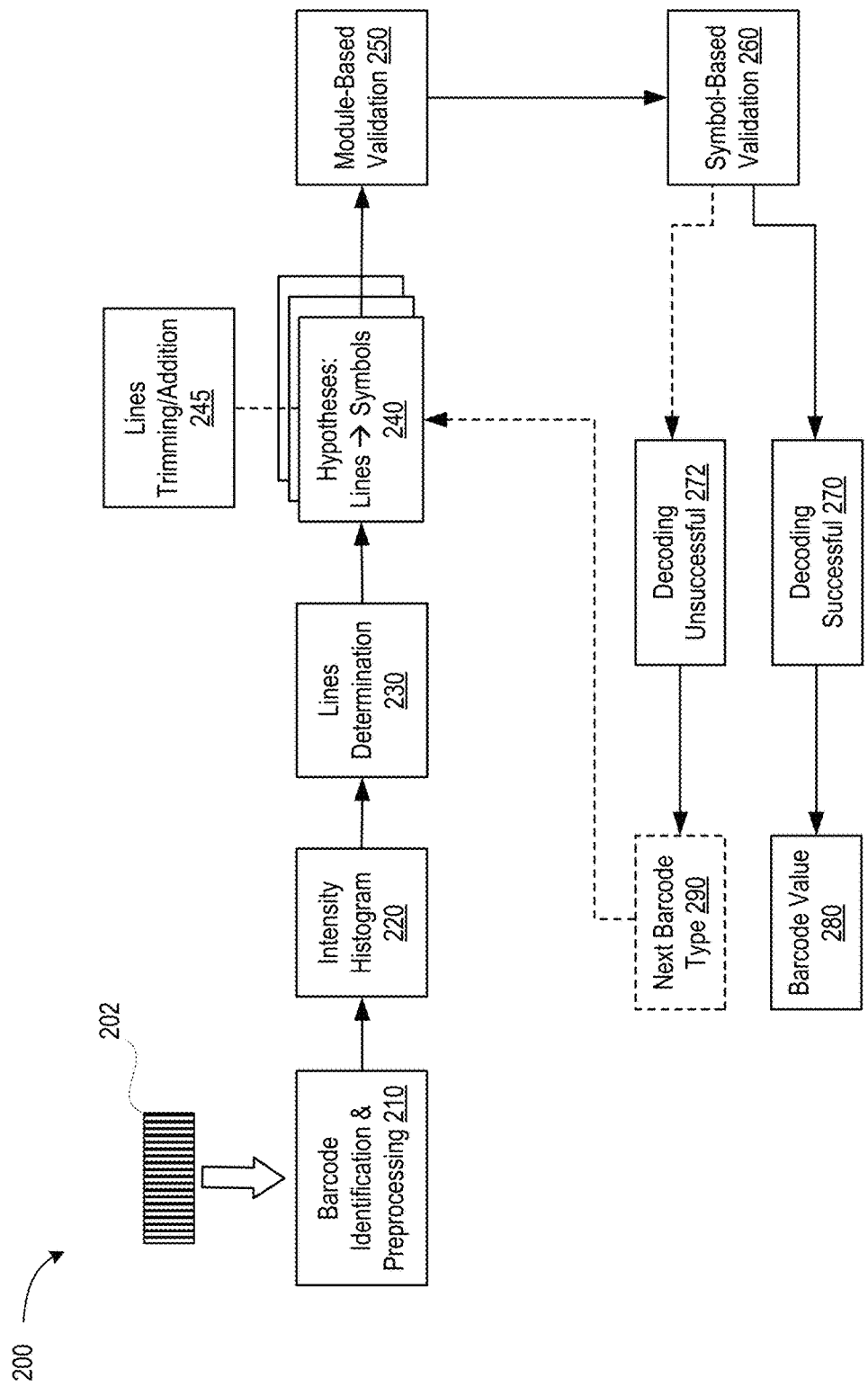
FIG. 2 illustrates example operations of processing images of one-dimensional barcodes that are robust against unfavorable conditions and various image imperfections, in accordance with some implementations of the present disclosure.

FIG. 2 illustrates example operations 200 of processing images of one-dimensional barcodes that are robust against unfavorable conditions and various image imperfections, in accordance with some implementations of the present disclosure. Example operations 200 will be illustrated with references to FIGS. 3-7, which highlight various aspects of barcode image processing. In some implementations, example operations 200 may be performed using example computer system 100 of FIG. 1.

A barcode image 202 may be an image of one or more UPC, EAN, Code 39, Code-128, etc., barcodes. Barcode image 202 may undergo barcode identification and preprocessing 210, which may include cropping barcode image 202 from a document or from an image or a product, advertising materials, and the like. Barcode identification and preprocessing 210 may further include enhancing quality of barcode image 202 (e.g., de-blurring, filtering, sharpening, etc.) and identifying main directions of the barcode, such as a direction along barcode lines (referred herein to as the vertical direction, for conciseness) and a direction across the barcode lines (referred herein to as the horizontal direction). For example, the main directions may be identified by applying any suitable directional filter to barcode image 202.

An output of barcode identification and preprocessing 210 may be a pixelated image of a 1D barcode suitably aligned relative to the horizontal and vertical directions. Each pixel of the barcode image may have intensity ranging from I=0 (e.g., purely black color) to I=1 (purely white color). As a result of image imperfections and physical limitations of imaging devices, some (or even most) pixels may have intensity that is between these limits, e.g., intensity 0.2, 0.85, and so on. Even though the barcode image may be oriented along the horizontal direction, it may still be unknown whether the left edge of the barcode image corresponds to the start or the end of the barcode (e.g., whether the barcode image is rotated by 180 degrees).

Next, a processing device performing example operations 200 may construct an intensity histogram 220. In one implementation, pixel intensities $I_{jk}$ of the barcode (with index j enumerating pixels in the horizontal direction and index k enumerating pixels in the vertical direction) may be used to construct average intensity values for a column of pixels, e.g., $$H_j = \frac{1}{N}\sum_{k=1}^{N} I_{jk},$$

where N is the height (in pixels) of the barcode image (or any suitable portion of the barcode) along the vertical direction. In some implementations, the sum of intensities $$\Sigma_{k=1}^{N} I_{jk}$$

may be used instead of the average intensity. FIG. 3A illustrates construction of an intensity histogram of a linear barcode image, in accordance with some implementations of the present disclosure. More specifically, an intensity histogram 302 represents average intensities of pixel columns of a portion 304 of a barcode image. Portion 304 may extend along the full length of the barcode image in the horizontal direction and at least a fraction of the barcode's height in the vertical direction. In some implementations, the height of the portion in the vertical direction may be sufficiently large to capture at least a substantial part of barcode lines (for increased accuracy).

With a continuing reference to FIG. 2, the intensity histogram 220 may be used to perform barcode lines determination 230, e.g., using any suitable methods of binarization. For example, histogram pixel intensities below a certain (e.g., empirically determined) threshold $H_j < H_T$ may be assigned a black color and histogram pixel intensities above the threshold $H_j \geq H_T$ may be assigned a white color. In some implementations, binarization may be adaptive, taking into account a context of the entire barcode. For example, a background of the barcode image may first be estimated and a normalized barcode image may be generated using the estimated background. A fixed threshold $H_T$ may then be applied. In some implementations, binarization may be performed on a patch-by-patch basis using patch-specific thresholds. The thresholds may be additionally smoothed between different patches. In some implementations, binarization may be performed on a pixel-by-pixel basis with a sliding window established for each pixel, and using a pixel-specific threshold $H_T$ determined based on statistics of pixel intensities within the sliding window.

The binarization determines boundaries between estimated black and white barcode lines. FIG. 3B illustrates determination of barcode lines based on the intensity histogram of FIG. 3A, in accordance with some implementations of the present disclosure. More specifically, a binarized intensity histogram 306 determines line boundaries, which are marked with vertical lines in FIG. 3A. The line boundaries superimposed over the barcode image are also shown in the depiction 308 of the portion 304 of the barcode image. The output of lines determination 230 may be a sequence of widths $w_j$ of alternating black and white barcode lines. Widths $w_j$ may be measured in units of pixels.

With a continuing reference to FIG. 2, at block 240, the determined lines may be grouped into barcode symbols of a specific barcode type. Multiple hypotheses that group lines into symbols may be formed. A number of factors make it advantageous to form multiple hypotheses. For example, different barcode symbols may have a different number of lines. The barcode may have an unknown (e.g., left-to-right or right-to-left) directionality. Additionally, while typical barcodes have quiet (e.g., white) zones to the left of the barcode and to the right of the barcode, sometimes barcodes are nonetheless placed close to other objects (e.g., table separation lines, other images and/or objects, and so on). As a result, one or more spurious lines may be detected by the histogram analysis and added to the actual barcode lines. To account for such situations, some formed hypotheses may exclude (filter) one or more edge lines.

Figure 4A:
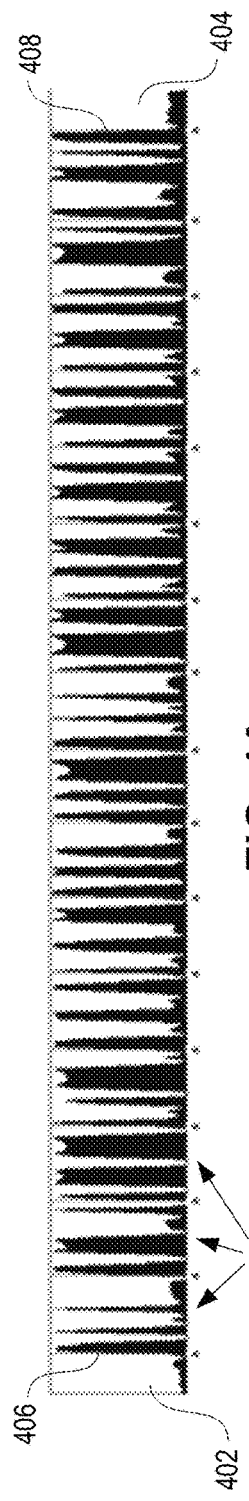
FIGS. 4A-D illustrate formation of hypotheses that filter out one or more edge barcode lines, in accordance with some implementations of the present disclosure.
Figure 4B:
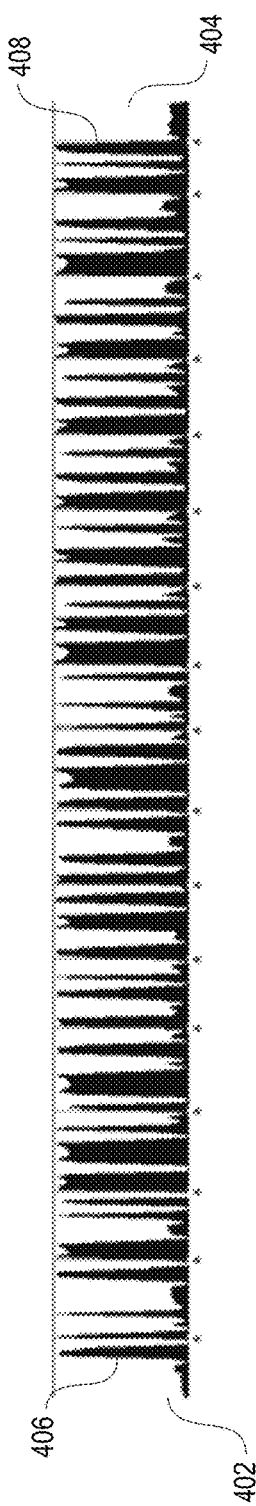
Figure 4C:
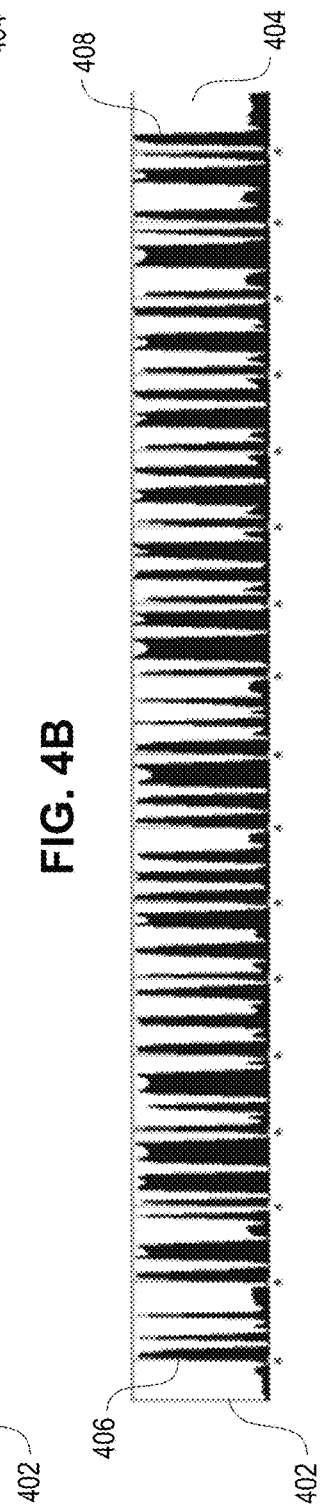
Figure 4D:
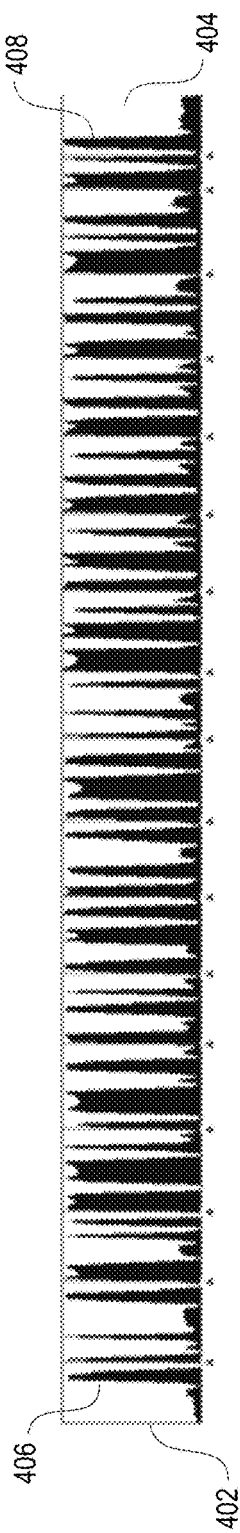

FIGS. 4A-D illustrate formation of hypotheses that filter out one or more edge barcode lines, in accordance with some implementations of the present disclosure. More specifically, FIG. 4A illustrates a first hypothesis that presumes that both the left quiet zone 402 and the right quiet zone 404 are present. The little triangles indicate grouping of the barcode lines into symbols. Both the leftmost line 406 and the rightmost line 408 are included in the hypothesized barcode symbols. FIG. 4B illustrates a second hypothesis that presumes that the right quiet zone 404 is present but that the left quiet zone 402 has been violated. Correspondingly, the second hypothesis presumes that the leftmost line 406 is a spurious line that is, therefore, excluded from the hypothesized grouping of lines into barcode symbols. FIG. 4C illustrates a third hypothesis that presumes that the left quiet zone 402 is present but that the right quiet zone 406 has been violated. The third hypothesis presumes that the rightmost line 408 is a spurious line that is, therefore, excluded. Finally, FIG. 4D illustrates a fourth hypothesis that presumes that both the left quiet zone 402 and the right quiet zone 404 have been violated. The fourth hypothesis, therefore, presumes that both the leftmost line 406 and the rightmost line 408 are spurious lines and excludes both of these lines.

In some instances, one or more spurious lines may be present inside the barcode image. For example, a barcode may be affixed to an underlying surface with a fold (crease) that appears as a line across the barcode image. A line may result from a scanning artifact, an object in the foreground, from merging of multiple images, or for any number of other reasons. Operations of the lines trimming/addition 245 component (in FIG. 2) may generate a number of hypotheses in which one or more lines are added or removed. Lines that are removed may include a set of lines that are routinely removed (for at least some hypotheses), such as one, two, or any other predetermined number of lines. In some implementations, each line identified by lines determination 230 may be removed at least in one hypothesis. Additionally, some lines may be removed contingent on satisfaction of various conditions, e.g., a line having a particular length, an unusually small width, unusually large width, and so on. In some implementations, hypotheses may be generated and processed (e.g., in a pipelined fashion) without waiting for other hypotheses to be generated.

The generated hypotheses may undergo various instances of validation (verification). More specifically, a module-based validation 250 may validate or discard some of the generated hypotheses based on the uniformity of the module size for different symbols. For example, a given hypothesis may include M symbols $S_j(j=1 \ldots M)$, each symbol having one or more lines. For each symbol $S_j$, the module size $a_j$ may be estimated and a sequence of module sizes $a_1 \ldots a_M$ may be analyzed. In some implementations, the maximum module size $a_{max}=\max(a_1 \ldots a_M)$ and the minimum module size $a_{min}=\min(a_1 \ldots a_M)$ may be determined and the ratio of the maximum module size to the minimum module size $a_{max}/a_{min}$ may be computed. Large ratios $a_{max}/a_{min}$ may be indicative of a hypothesis that has incorrect grouping of lines into symbols. Correspondingly, hypotheses with the ratio $a_{max}/a_{min}>R_T$ exceeding some (empirically determined) threshold $R_T$ may be invalidated (discarded).

In some instances, a large ratio $a_{max}/a_{min}$ may be a consequence of the barcode image having a perspective (e.g., the image may be taken at an angle to the imaging plane of a camera) or at least a portion of the barcode image having a perspective (e.g., the barcode may be affixed to a bent surface). Such situations, even though giving rise to large ratios $a_{max}/a_{min}$ may nonetheless be described by valid hypotheses, with most different module sizes $a_{max}$ and $a_{min}$ located at opposite edges of the barcode. To capture such situations, a set of module size ratios may be determined, $\beta_j=a_{j+1}/a_j$, and the obtained set $\beta_1 \ldots \beta_{M-1}$ may be analyzed. For a frontal view of a barcode and a viable hypothesis, the set of values $\beta_1 \ldots \beta_{M-1}$ may be grouped near value 1, plus or minus a certain fluctuation or standard deviation (e.g., 0.1, 0.2, etc.) that is caused by camera accuracy, pixel resolution of the lines determination 230, and the like. For a frontal view of the barcode and an incorrect hypothesis, the set of values $\beta_1 \ldots \beta_{M-1}$ may have the standard deviation that is larger than a certain (empirically determined) threshold, e.g., 0.5, 0.7, etc. For angled view of the barcode with a perspective, a viable hypothesis may have the set of values $\beta_1 \ldots \beta_{M-1}$ that is grouped near a value different from 1 (which may be less or greater than 1) with a small standard deviation, less than the threshold value. Accordingly, even if $a_{max}/a_{min}>R_T$, an additional check may be performed using the set of ratios $\beta_1 \ldots \beta_{M-1}$, and in those instances where fluctuations in the set are below a threshold value, the corresponding hypothesis may be retained.

The hypotheses that pass module-based validation 250 may undergo further verification, including a symbol-based validation 260. Symbol-based validation 260 may verify viability of groupings of barcode lines into symbols. In the instances of groupings of barcode lines that do not correspond to any defined (according to a particular barcode type specification) symbol, the respective hypotheses may be discarded. Groupings that are similar to one of the defined symbols may be further evaluated to ascertain a degree of similarity. FIGS. 5A-B illustrate symbol-based validation of hypotheses during processing of images of one-dimensional barcodes, in accordance with some implementations of the present disclosure. FIG. 5A depicts an example symbol 502 that is hypothesized to correspond to a specific reference symbol 504 defined, e.g., in a table of barcode symbols, for a particular barcode type. In the implementation illustrated in FIG. 5A, symbol 502 and reference symbol 504 are represented with histograms. As indicated with the sloped histogram peaks, reference symbol 504 histogram may simulate blurring of barcode line boundaries encountered in typical applications. The blurring may occur over a certain number of pixels, which may be application-specific and may be determined based on field testing of various barcode images acquired in the course of using a specific application.

Reference symbol 504 may be generated based on the sequence of black and white modules taken from the table of barcode symbols, e.g., 11000101. Each module may be rasterized using a fixed number (along the horizontal direction) of pixels, e.g., 1 pixel, 2 pixels, 4 pixels, etc. For example, the 8-module reference symbol 11000101 may be represented with 64 pixels if each module is represented using 8 pixels.

Because the width of symbol 502 may be different from the width of reference symbol 504, the relative scale of the two symbols may be changed to obtain the best fit. FIG. 5B depicts schematically how the fitting may be performed. More specifically, reference symbol 504 may undergo rescaling 506, which may include stretching or compression in the horizontal direction as well as shifting 508, to obtain the best fit (overlap) with symbol 502. Rescaling 506 may be performed using linear interpolation. Although FIG. 5B illustrates rescaling and shifting of reference symbol 504, in some implementations, rescaling and/or shifting of symbol 502 may be used instead. In some implementations, any relative rescaling and/or shifting of symbol 502 and reference symbol 504 may be used to obtain the best overlap.

In some implementations, during construction of the initial reference symbol 504, a white line and/or a black line may be added to the edges of reference symbol 504 to better simulate blurring of edge line boundaries of realistic barcode images during rescaling 506 For example, a while line (e.g., a single-module line) may be added to the left of a reference symbol 01100111 (with 0 denoting a black module and 1 denoting a white module) and a black line may be added to the right of this reference symbol, to obtain the 1011001110 symbol. The presence of a pair of lines of opposite colors at the edges of the reference symbol (e.g., black/white pairs 10 in this example) facilitates generation, during interpolation, of realistic smoothed transitions of the edge lines of reference symbol 504.

The best fit between symbol 502 and reference symbol 504 may be determined using any suitable correlation coefficient (e.g., Pearson correlation coefficient), referred herein to as a similarity factor (SF). For example, if $I_S(p)$ is the intensity map of symbol 502 (with p enumerating pixels in the horizontal direction), and if $I_{RS}(p)$ is the intensity map of reference symbol 504, the similarity factor characterizing how well symbol 502 matches reference symbol 504 may be determined as follows, $$SF(\alpha, s) = \frac{1}{\sigma_S \cdot \sigma_{RS}} \sum_p [I_S(p) - \overline{I_S}] \cdot [I_{RS}(\alpha \cdot p + s) - \overline{I_{RS}}],$$

where the summation is performed over pixels of the symbols, $\alpha$ is the rescaling parameter, and s is the shifting parameter, $\overline{I_S}$ is the average pixel intensity for symbol 502, $\overline{I_{RS}}$ is the average pixel intensity for the rescaled reference symbol 504, $\sigma_S$ is the variance of the intensity $I_S(p)$ of symbol 502, and $\sigma_{RS}$ is the variance of the intensity $I_{RS}(p)$ of rescaled symbol 510. The similarity factor, as defined here, may have a value within the interval [−1,+1], with value +1 corresponding to identical (fully correlated) symbols, value 0 corresponding to uncorrelated symbols, and value −1 corresponding to fully anticorrelated symbols (e.g., symbols that are the inverse of each other).

The similarity factor $SF(\alpha, s)$ may be maximized by treating the rescaling parameter $\alpha$, and the shifting parameter s as fitting parameters. The maximum values of the similarity factors $SF_j=[SF(\alpha, s)]$ determined for each symbol $S_j$ of a given hypothesis may then be used to validate or discard the hypothesis. In some implementations, hypotheses which have at least one similarity factor $SF_j$ below a certain empirical threshold $SF_1$ may be discarded. In some implementations, hypotheses that have at least two, three, etc., symbol with $SF_j<QF_1$ may be discarded. In some implementations, hypotheses with an average similarity factor (across all symbols of the hypothesis) below a threshold $SF_2$ (which may be different from threshold $SF_1$) may be discarded. The thresholds $SF_1$, $SF_2$, etc., may be determined empirically and may depend on the specific barcode type. Thresholds $SF_1$, $SF_2$, etc., that are set too low may result in false determinations of symbols and, correspondingly, in incorrectly decoded barcodes. Thresholds $SF_1$, $SF_2$, etc., that are set too high may result in some barcodes not being read. Accordingly, optimal thresholds may be determined during empirical testing that balances precision (low number of falsely decoded barcodes) with recall (low number of barcodes that have not been decoded).

It should be understood that the above example of computing the similarity factors is intended as an illustration and that other equations or algorithms may be used to estimate how well symbols $S_j$ of a given hypothesis match various reference symbols of the specific barcode type. Additionally, while in the illustration of FIGS. 5A-B symbols and reference symbols are represented with histograms (which simulate blurred boundaries), in other implementations reference symbols may be represented with lines having sharp boundaries and symbols identified in barcode images may be binarized representations obtained in the course of lines determination 230, as described above.

After some of the hypotheses have been invalidated based on a module size or low similarity factors for barcode symbols, the best hypothesis may be selected based on a plurality of similarity factors of each hypothesis, to maximize the total quality of the hypothesis. More specifically, for each or at least some remaining hypotheses, symbol-based validation 260 may further include computing an aggregated similarity factor ASF which may be constructed using a set $\{SF_j\}$ of similarity factors of the respective hypothesis. In some implementations, the aggregated similarity factor may be a simple sum of the similarity factors of individual barcode symbols:

$$ASF = \sum_j SF_j.$$

In some implementations, the aggregated similarity factor may be a sum of some functions of the similarity factors, e.g., the inverse logarithms of the similarity factors, $$ASF = -\sum_j \frac{1}{\ln SF_j},$$

or $$SF = -\left(\sum_j \ln SF_j\right)^{-1}.$$

It should be understood that practically unlimited number of ways exist to aggregate similarity factors of individual barcode symbols into an aggregated similarity factor for the whole hypothesis, e.g., $$AQF = g\left(\sum_j f(QF_j)\right),$$

where f(•) and g(•) are some user-selected (developer-selected) functions.

Figure 6:
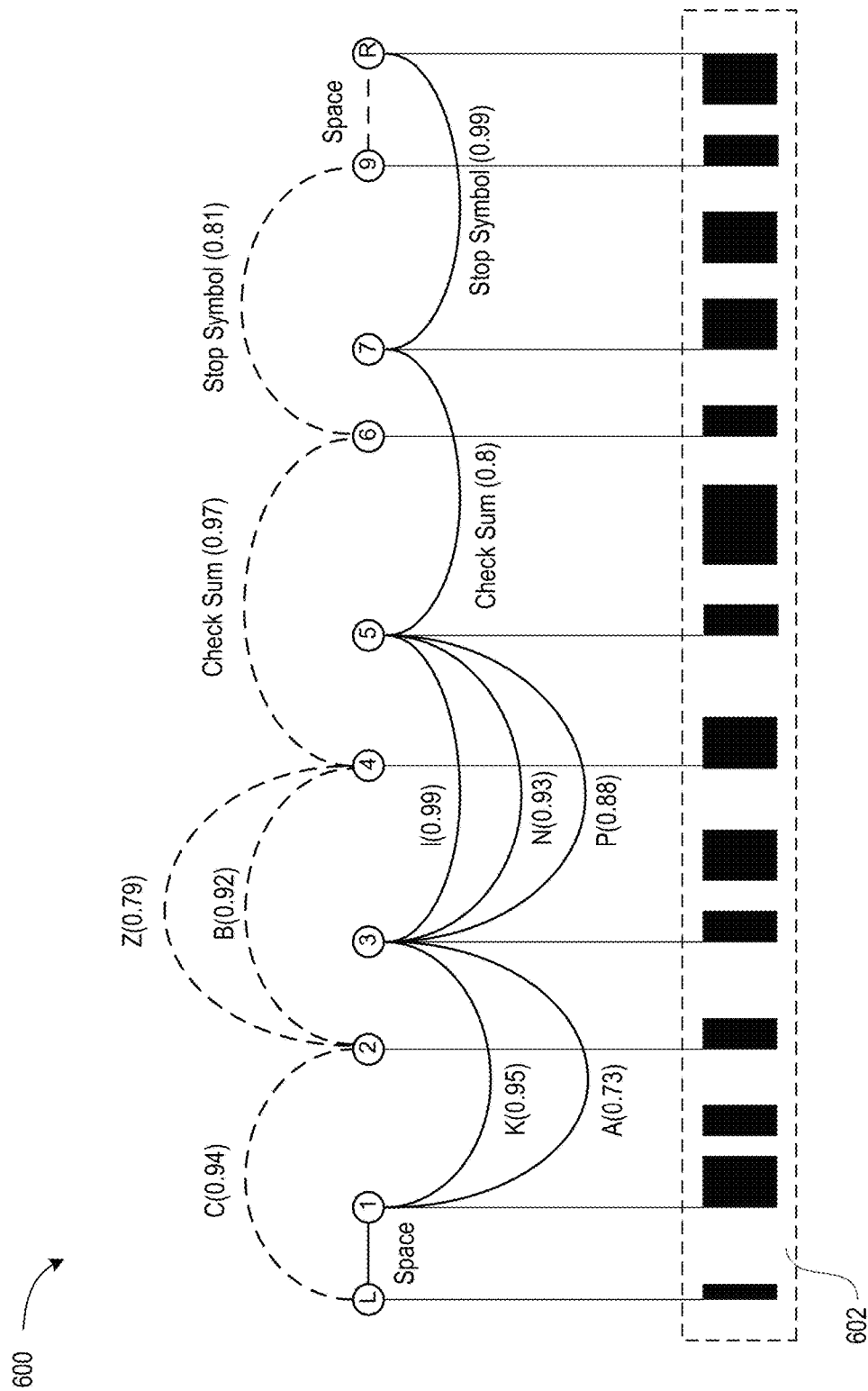
FIG. 6 depicts a graph illustrating evaluation of hypotheses during decoding of one-dimensional barcodes, in accordance with some implementation of the present disclosure.

The computing device performing barcode detection and decoding may maintain track of computed aggregated similarity factors and perform selection of the final (preferred) hypotheses using a graph representation. FIG. 6 depicts a graph illustrating evaluation of hypotheses during decoding of one-dimensional barcodes, in accordance with some implementation of the present disclosure. A binarized barcode image 602 may have a number of lines determined and grouped into barcode symbols. A set of graph vertices is denoted with circles. The graph vertices correspond to boundaries of hypothesized barcode symbols (groupings of lines). The leftmost vertex, denoted with L, corresponds to the left edge of the barcode image 602. The rightmost vertex, denoted with R, corresponds to the right edge of the barcode image 602. Two groupings of lines into barcode symbols are shown. The grouping illustrated with solid edges corresponds to discarding the leftmost line ("space") of the barcode image 602; the lines located between vertex 1 and vertex 3 are grouped into a first barcode symbol, the lines located between vertex 3 and vertex 5 are grouped into a second barcode symbol, and so on. Similarly, the grouping illustrated with dashed edges corresponds to discarding the rightmost line of the barcode image 602; the lines located between vertex L and vertex 2 are grouped into a first barcode symbol, the lines located between vertex 2 and vertex 4 are grouped into a second barcode symbol, and so on. Each grouping may be further used to generate multiple hypotheses. More specifically, a barcode symbol corresponding to the edge 2-4 may be similar to letter B with similarity factor (stated in parentheses) SF=0.92 and to letter Z with similarity factor 0.79. Likewise, a barcode symbol corresponding to the edge 3-5 may be similar to letter I with similarity factor 0.99, to letter N with similarity factor 0.93, and to letter P with similarity factor 0.88.

In some implementations, hypotheses with the highest aggregated similarity factor may be selected. For example, among the hypotheses associated with dashed lines edges, the hypothesis where the first symbol is C and the second symbol is B may have the highest aggregated similarity factor. For those barcode types that deploy checksums, an additional checksum-based verification of hypotheses may be performed. A checksum symbol (or multiple checksum symbols) is a barcode symbol located at a known position (e.g., the second to the last symbol from the right edge) and whose value is computed from data-carrying symbols using a known function defined in the specification of the barcode type. Correspondingly, if a hypothesis includes a checksum symbol that does not match the data-carrying symbols, such a hypothesis is discarded. For example, if the checksum of the first hypothesis with the first symbol is C and the second symbol B does not match the value of the checksum symbol (corresponding to the edge 4-6) while the checksum of the second hypothesis with the second symbol Z matches the value of the checksum symbol, the first hypothesis may be discarded and the second hypothesis may be retained even though the second hypothesis may have a lower aggregated similarity factor.

The remaining hypotheses, which have passed all validation checks, e.g., the module-based validation, the symbol-based validation, and the checksum validation (if applicable), may be ranked by the respective aggregated similarity factors. The hypothesis with the highest aggregated similarity factor may be selected as the most likely hypothesis and the barcode decoding may be recognized as successful (block 270). The barcode value 280 is then read from the selected hypothesis using the list (table) of symbols of the respective barcode type. If no hypothesis remains after the validation checks are completed, decoding may be recognized as unsuccessful (block 272). Responsive to an unsuccessful barcode decoding, the computing device performing barcode decoding may select another barcode type (block 290) and form a new set of hypotheses for the new selected barcode type. The operations of hypotheses verification may then be repeated for the new barcode type substantially as described above.

Figure 7:
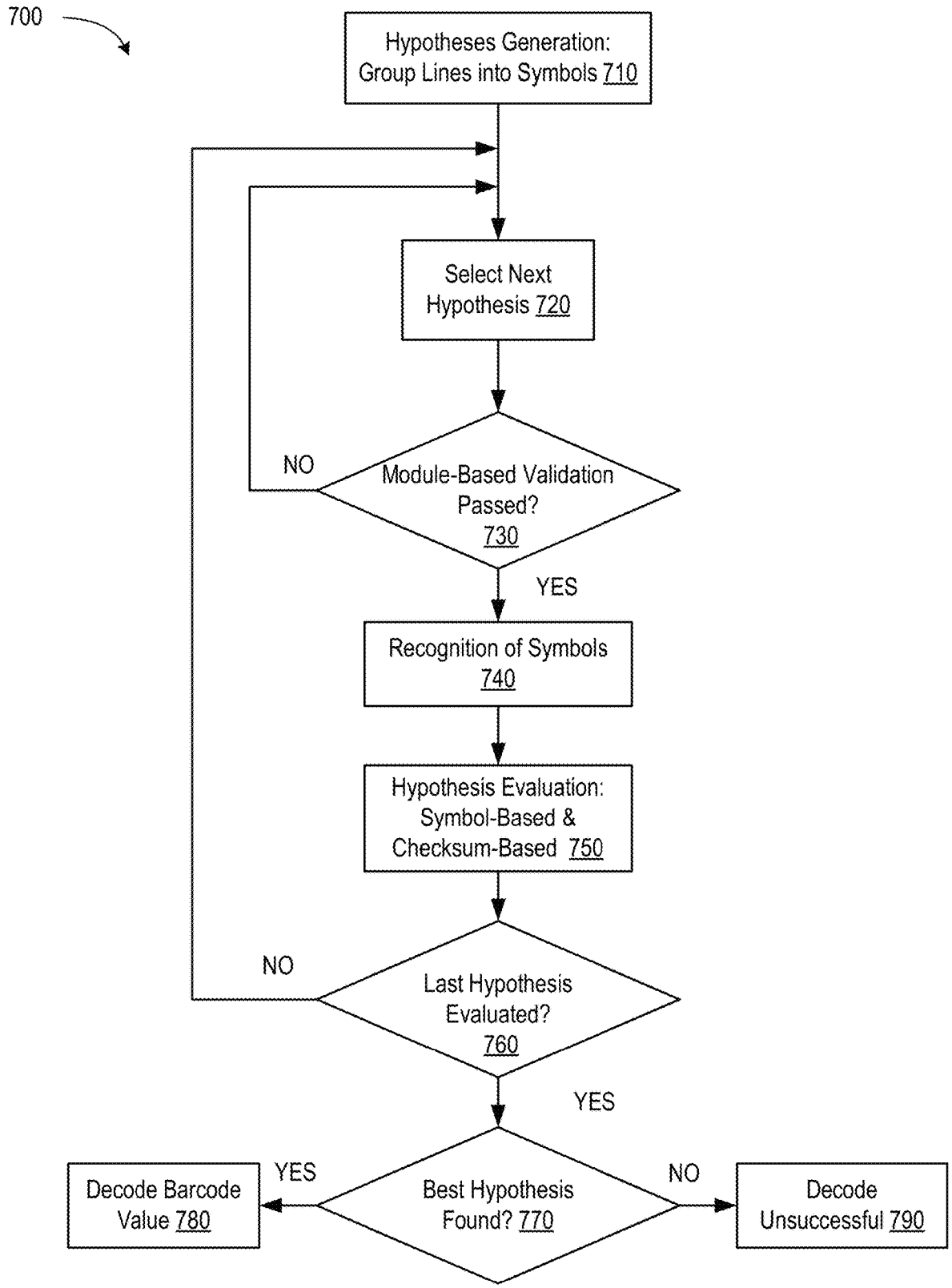
FIG. 7 is a flowchart depicting example operations of processing of hypotheses during decoding of one-dimensional barcodes, in accordance with some implementations of the present disclosure.

FIG. 7 is a flowchart depicting example operations 700 of processing of hypotheses during decoding of one-dimensional barcodes, in accordance with some implementations of the present disclosure. In some implementations, example operations 700 may be performed after barcode lines are determined, e.g., using adaptive binarization as described above or using any other suitable techniques. At block 710, one or more hypotheses may be generated by grouping the determined barcode lines into symbols using various combinations of barcode lines. At block 720, one of the hypotheses may be selected for validation or elimination. At block 730, module-based validation may be performed, e.g., as described above, based on consistency of module sizes across various barcode symbols. If the selected hypothesis fails the module size consistency check (the NO-branch), another hypothesis may be selected at block 720 and the module-based validation of block 730 may be repeated. If the current hypothesis passes the module size consistency check, each symbol (line group) may be associated with various possible candidate barcode symbols. At this stage, identification may be performed while erring on the side of overinclusion, as elimination of unviable hypotheses may be performed at the next block. As a result, at block 730, the number of hypotheses may be increased, since each grouping of the lines may lead to multiple candidate barcode symbols at various locations in the barcode. At block 740, evaluation of the available hypotheses may be performed using symbol-based validation (based on similarity factors determined for various candidate barcode symbols) and/or checksum-based validation, as described above in relation to FIG. 6. During operations of block 740, various candidate barcode symbols may be discarded as having low similarity factors, as resulting in an aggregated similarity factor that is inferior to aggregated similarity factors obtained with other candidate barcode symbols, as resulting in incorrect checksum values, and so on. At block 740, available hypotheses may be discarded or validated (retained as possible candidates).

At block 750, the computing device that performs hypotheses selection and validation may determine whether all hypotheses (barcode line groupings) have been evaluated. After all generated hypotheses are evaluated, the best hypothesis may be selected at block 760, e.g., based on the highest aggregated similarity factor. If the best hypothesis has been identified, the barcode value may be obtained (decode) at block 780. If no hypothesis survives the evaluation(s), decoding of the barcode image may be recognized, at block 790, as unsuccessful.

Example operations 700 correspond to one possible implementation of hypotheses processing. In some implementations, the order of operations may be different. Some operations shown in FIG. 7 may be omitted. Some operations not shown in FIG. 7 may be added. For example, in the implementation of FIG. 7 multiple hypotheses are generated prior to evaluation. In other implementations, hypotheses may be generated one by one and evaluated prior to generation of other hypotheses. When a viable hypothesis passes all checks (e.g., module-based, symbol-based, checksum-based, etc., checks) and has an aggregated similarity factor that is equal or greater than a certain (empirically established) threshold, generation of subsequent hypotheses may be ceased and the identified hypotheses may be used for decoding the barcode. In some implementations, multiple hypotheses may be evaluated concurrently, e.g., using parallel processing. In some implementations, parallel processing may be performed using a graphics processing unit (GPU).

Figure 8:
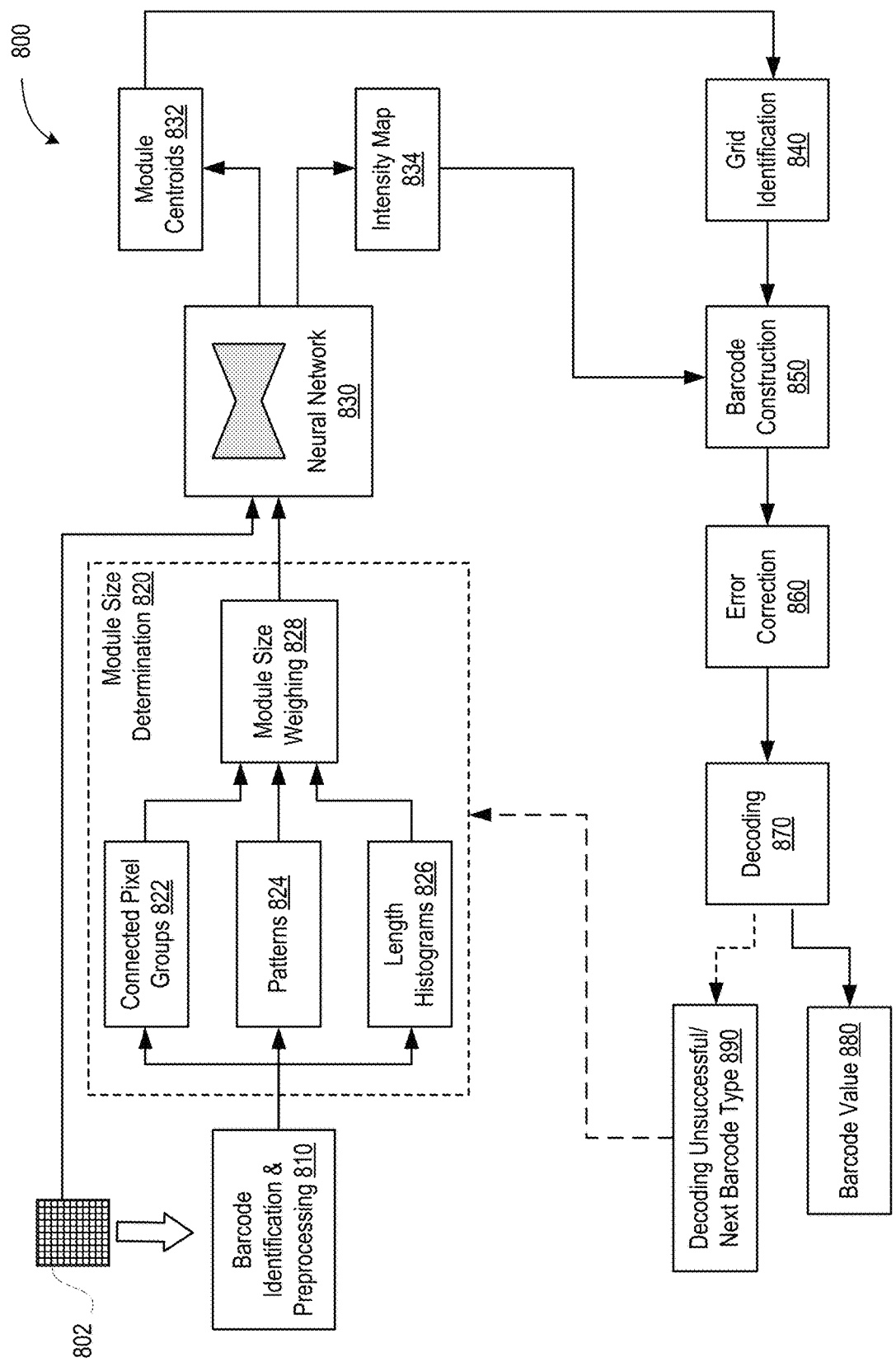
FIG. 8 illustrates example operations of processing images of two-dimensional barcodes that are robust against unfavorable conditions and various image imperfections, in accordance with some implementations of the present disclosure.

FIG. 8 illustrates example operations 800 of processing images of two-dimensional barcodes that are robust against unfavorable conditions and various image imperfections, in accordance with some implementations of the present disclosure. Example operations 800 will be illustrated with references to FIGS. 9-13, which highlight various aspects of processing. In some implementations, example operations 800 may be performed using example computer system 100 of FIG. 1.

A barcode image 802 may be an image of one or more QR barcodes, Data Matrix barcodes, Aztec barcodes, and so on. Barcode image 802 may undergo barcode identification and preprocessing 810, which may include cropping barcode image 802 from a document or an image or a product, advertising materials, and the like. Barcode identification and preprocessing 810 may further include enhancing quality of barcode image 802 (e.g., de-blurring, filtering, sharpening, etc.) and identifying orientation of the barcode, e.g., directions of the sides of the barcode.

An output of barcode identification and preprocessing 810 may be a pixelated image of a 2D barcode properly aligned relative to the horizontal and vertical directions. Each pixel of the barcode image may have intensity ranging from I=0 (e.g., purely black color) to I=1 (purely white color). As a result of image imperfections and physical limitations of imaging devices, some (or even most) pixels may have intensity that is between these limits, e.g., 0.2, 0.85, and so on. Even though the barcode image may be oriented along the horizontal and vertical directions, it may still be unknown which side of the barcode is the top side, the right side, and so on (e.g., whether the barcode image is rotated by 90 degrees, 180 degrees, 270 degrees).

Figure 9D:
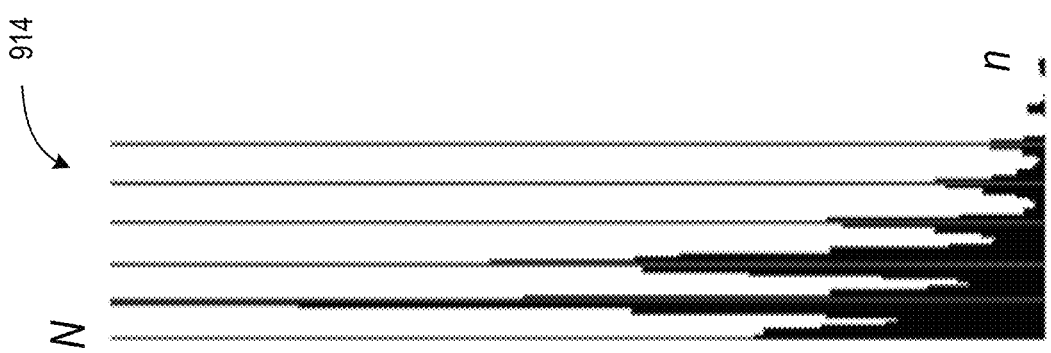
FIG. 9A-D illustrate various techniques of module size determination during processing of images of two-dimensional barcodes, in accordance with some implementations of the present disclosure.
Figure 9C:
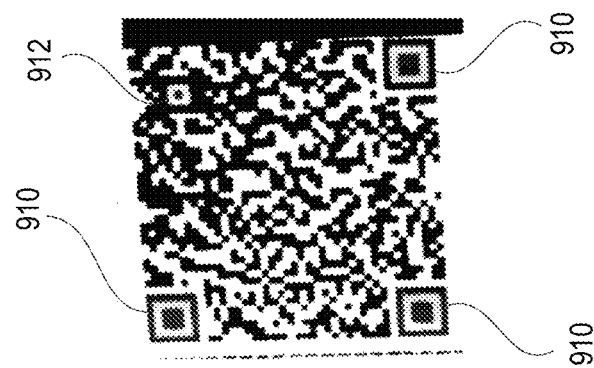
Figure 9A:
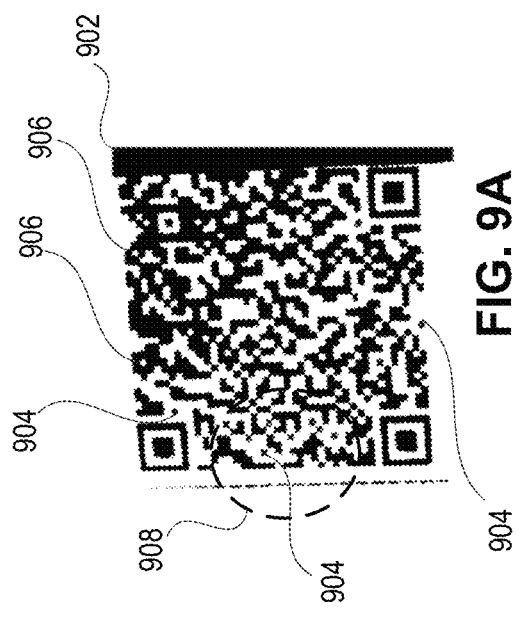
Figure 9B:
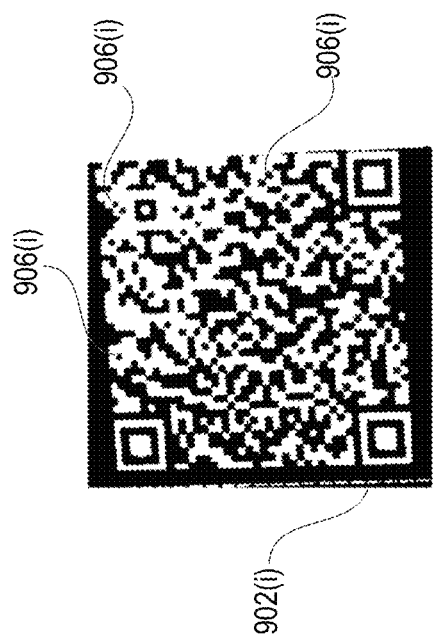

A processing device performing example operations 800 may determine the module size for barcode image 802. A module of a 2D barcode may be a square (e.g., a black square) whose size, as may be depicted in barcode image 802, is generally not known apriori. A number of different techniques may be applied to estimate module size. In some implementations, connected pixel regions may be identified (block 822). More specifically, a 2D barcode may include a number of single-module black squares and a number of single-module white squares. Such single-module regions of the barcode may be used to determine the module size in pixels of barcode image 802. FIG. 9A-D illustrate various techniques of module size determination during processing of images of two-dimensional barcodes, in accordance with some implementations of the present disclosure FIG. 9A illustrates a 2D barcode image 902 with single-module regions 904. Additionally, single-module regions 906 of the opposite (white) color may be used for improving accuracy of model size determination. FIG. 9B depicts image 902(i) which represents the inverted 2D barcode image 902 (where black pixels are replaced with white pixels and vice versa). In image 902(i), white single-module regions 906 of barcode image 902 appear as black single-module regions 906(i).

Operations of block 822 of FIG. 8 may include identifying connected regions of pixels of various sizes. For example, a connected region may be any region that includes pixels having at least one neighbor directly above, below, to the right, or to the left of a given pixel. In some implementations, connected regions may be obtained by tracking pixel intensity I(j, k) of pixels with coordinates (j, k) and comparing pixel intensity I(j, k) with pixel intensities I(j±1, k) and I(j, k±1) of the neighboring pixels. The pixel intensities I(j, k) may be binarized based on pixel intensities of barcode image 902. For example, binarized pixel intensities may be defined as $$I_{bin}(j, k) = \{0, I(j, k) < I_0.1, I(j, k) \geq I_0,$$

where a pixel with coordinates (j, k) and intensity below a certain threshold $I_0$ (which may be 0.5 or any other value) is replaced with a black pixel and a pixel with intensity above the threshold $I_0$ is replaced with a white pixel. The connected regions may be classified by their size, which may include a total number of pixels in a connected region, a maximum extent of the connected region along horizontal or vertical directions, a number of boundary pixels (pixels that abut at least one pixel that does not belong to the connected region), and so on. Connected regions that have the smallest size and approximately square or rectangular shape, e.g., n×m pixels, may be selected among various connected regions detected in the barcode image 902. In some implementations, all such regions may be used for module side determination. Connected regions that have pixel dimensions that are larger than the absolute minimum for the barcode image 902 may nonetheless be included. For example, is the smallest connected region has 5×5 pixels, connected regions of sizes 6×6 or 5×7 pixels may be included while connected regions that have 5×9 pixels, 8×8 pixels (and that are likely to include multiple modules) may be excluded. The size of the module a may then be determined as an average value of sizes of all such regions. To account for a possibility of the barcode plane being tilted relative to the focal plane of the camera/scanner, the size of the module may be determined (averaged) separately along the horizontal direction, ax, and the vertical direction, ay. In some implementations, the pool of the minimally-sized connected regions, which are used for module size determination, may include only a portion of all minimally-sized connected regions. For example, such a portion may correspond to a group (cluster) of minimally-sized connected regions located in some region of the barcode image. For example, for barcode image 902, a group of minimally-sized connected regions located inside a dashed oval 908 may be selected.

In some implementations, the determination of module size may be performed using connected regions of only one color, e.g., black or white (e.g., black regions of inverted barcode image). In some implementations, the determination of module size may be performed using connected regions of multiple colors, e.g., both black and white connected regions.

In some implementations, the module size in the barcode image may be determined (at block 824) using various patterns, e.g., finder patterns, timing patterns, or any other patterns defined in the barcode specification. FIG. 9C illustrates finder patterns 910 in the 2D barcode image 902 of the QR barcode type. Finder patterns 910 may have a distinct arrangement of a known number of modules. For example, each finder pattern 910 of a QR barcode may include, along the central horizontal or central vertical cross section, 1 black, 1 white, 3 black, 1 white, and 1 black module (the 1:1:3:1:1 pattern). Equivalently, a finder pattern 910 may be considered as a 3×3 square of modules inside a white 5×5 square of modules, which in turn is located inside a black 7×7 square of modules. An additional (alignment) pattern 912 (the 1:1:1:1:1 pattern) is shown in FIG. 9C. Accordingly, the determination of module size may involve identifying barcode type-specific patterns (e.g., white and black squares or frames), verifying that the proportion of the patterns corresponds to the proportions defined by the barcode specification, and estimating the module size based on pixel dimension of the identified pattern. Multiple module dimensions may be extracted from a single pattern and subsequently averaged. For example, an identified 1:1:3:1:1 finder pattern may provide up to five different module sizes for different horizontal cross sections and up to the same number of different module sizes for different vertical cross sections. Similarly to the module size determination that uses connected pixel regions (block 822), module sizes may be determined separately for the horizontal direction, ax, and for the vertical direction, ay.

FIG. 9C is intended as an illustration only. Other barcode types may have different finder patterns, e.g., Data Matrix barcodes may have finder patterns along two sides of a barcode (e.g., the left side and the bottom side) and a timing pattern (of alternating black and white modules) along the other two sides (e.g., the right and the top side). Aztec barcodes may have the 1:1:1:1:1:1:1 finder pattern located in the middle of a barcode; and so on.

In some implementations, the module size in the barcode image may be determined (at block 826) using length histograms. More specifically, the binarized barcode image may be scanned along different pixel lines in the horizontal and/or vertical directions and the number of pixels in continuous black and/or white lines may be counted. The number of times N(n) each horizontal and/or vertical line of length n (in pixels) may then be determined. The determined histogram N(n) represents the run-length encoding of the barcode image and may then be analyzed. FIG. 9D illustrates a run-length encoding histogram 914 for an example QR barcode image. The illustrated histogram 914 has the form of an oscillating and decreasing function N(n). Using any suitable technique, such as the Fourier transforms or the regression techniques, the period of the function N(n) may be determined, e.g., as an average period between adjacent harmonics. Separate histograms for black lines and white lines may be constructed and used for the module size determination, e.g., with the final estimate given by the average of the values obtained with histograms of different colors. Similarly to the module determination that uses connected pixel regions (block 822) and patterns (block 824), the module sizes may be determined separately for the horizontal direction and for the vertical direction.

In some implementations, only one or two of the described techniques of module size determination (e.g., any one or two of blocks 822, 824, and 826) may be used. In some implementations, if multiple techniques are used, an additional module size weighting (block 828) may be performed. In some implementations, a simple average of two or more estimates may be performed. In some implementations, module sizes determined using different techniques may be weighted differently, e.g., with larger weights given to techniques that provide higher accuracy under specific conditions, e.g., higher weights may be given to module sizes obtained using finder patterns. In some implementations, if module sizes determined using any two of the above-described techniques differ substantially (e.g., more than 1.5 times) from the third technique, the module size determined using the third technique may be discarded and the average (or weighted average) of the remaining module sizes may be used.

With a continuing reference to FIG. 8, barcode image 802 may be processed by a neural network 830. Prior to inputting barcode image 802 to the neural network 830, barcode image 802 may be rescaled using the determined module size. For example, if the neural network 830 is trained using module size A (in pixels) and the module size of barcode image 802 is determined to be a, the barcode image 802 may be rescaled (e.g., using linear interpolation techniques) by the factor A/a.

The neural network 830 may output segmentation of barcode image 802 into modules. The neural network 830 may include a common backbone and multiple classification heads. In some implementations, a first classification head may output module centroids 832, which may be, e.g., a set of pixel coordinates determined by neural network 830 to be the centers of various modules. For example, the output of the first classification map may include classifications of each pixel (or groups of pixels), e.g., classification c(j, k)=1 means that a given pixel with coordinates (j, k) is a center of a module (centroid) and classification c(j, k)=0 means that the pixel is not a centroid of any module of the barcode. In some implementations, the centroid (j, k) may correspond to the center of mass of the respective module. A second classification head may output a binarized intensity map I(j, k) 832 indicating whether pixel with coordinates (j, k) is identified as a white pixel I(j, k)=1 or as a black pixel I(j, k)=0.

Figure 10:
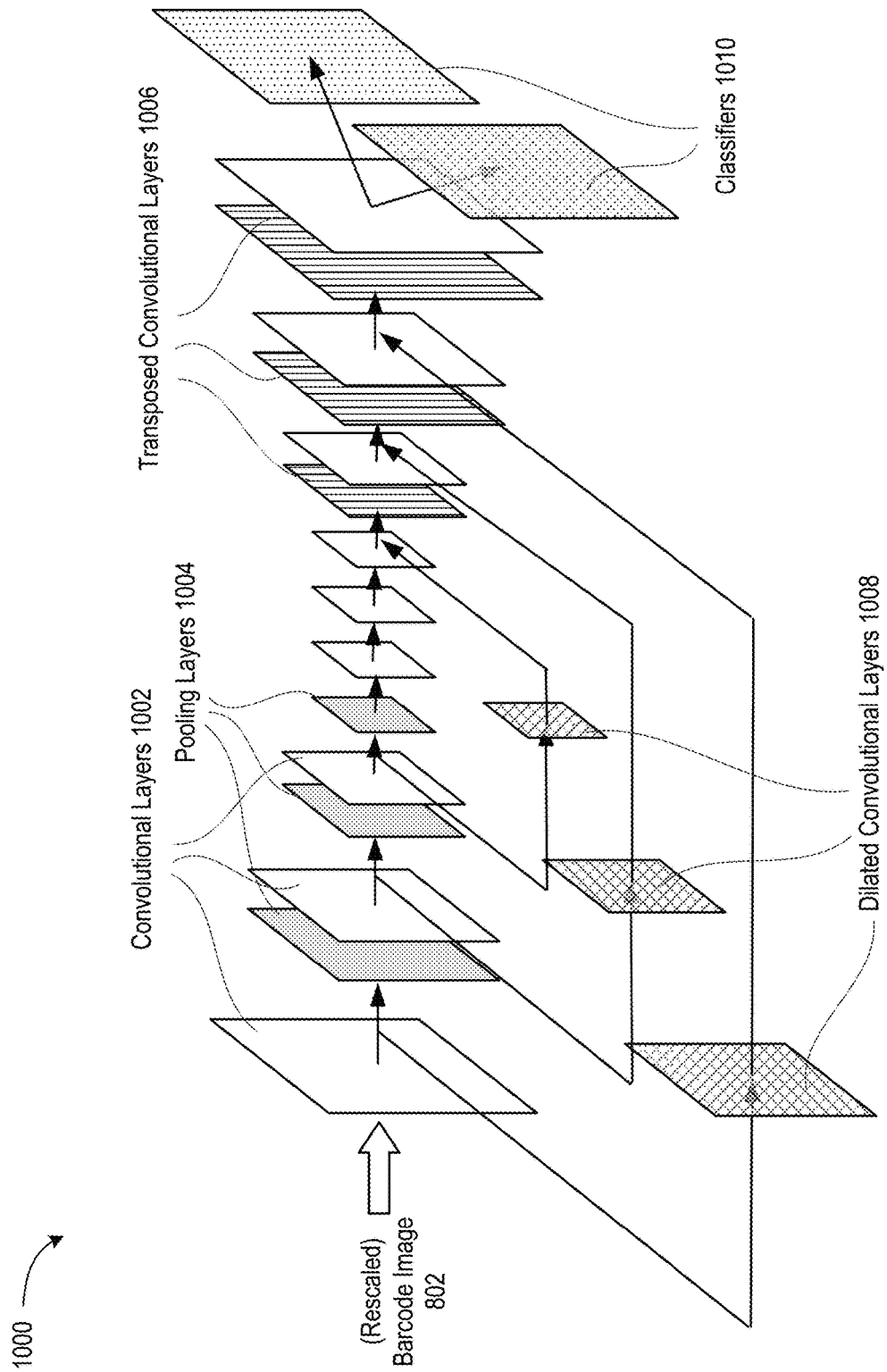
FIG. 10 illustrates example architecture of a neural network capable of generating outputs characterizing locations and intensity of modules of a barcode image, in accordance with some implementations of the present disclosure.

FIG. 10 illustrates example architecture of a neural network 1000 capable of generating outputs characterizing locations and intensity of modules of a barcode image, in accordance with some implementations of the present disclosure. The neural network 1000 illustrated in FIG. 10 may be neural network 830 of FIG. 8, which may process a rescaled barcode image 802. In some implementations, neural network 1000 may have a U-net architecture that includes an encoding portion and a decoding portion, each portion having multiple layers of neurons. More specifically, the encoding portion may include convolutional layers 1002 interspaced with pooling layers 1004, e.g., maximum pooling layers, average pooling layers, and the like. Additionally, the neural network 1000 may include one or more dilated convolutional layers 1008 with exponentially increasing size of the receptive field. Dilated convolutional layers 1008 may be placed at each (or some) level(s) of resolution (depth) of the encoder portion of the neural network 1000. This architecture allows collecting an expanded context of the barcode image at each level of depth in a computationally efficient way. In some implementations, at each level of depth of the encoder portion of the neural network 1000, at least one convolutional layer may be used together with a pooling layer, e.g., a 2×2 maximum pooling layer, to implement feature map downsampling. Each convolutional layer 1002 may include batch normalization layer and rectified linear unit (ReLU) activation.

Convolutional layers 1002 may have 3×3 kernels or any other suitable kernels. During the decoding stage, upsampling is performed using transposed convolutional layers 1006 with, e.g., a 2×2 kernel. Feature map smoothing may be performed with an additional convolutional layer. In some implementations, a number of kernels (channels) may increase linearly, e.g., as 8, 16, 24, 32, etc., with decreased resolution and may remain the same within a given resolution. The number of output channels of the transposed convolutional layers 1006 may be determined based on resolution of an output feature map. Additional atrous convolution sequences at each branch may include two layers with dilation rates 2 and 4, respectively. It should be understood that the architecture of the neural network 1000 illustrated in FIG. 10 is intended as a way of illustration but not limitation and that the number and types of layers and branches may vary in view of specific applications and objectives of processing.

Each classification head 1010 may include additional layers of neurons and a final classifier, which may be a ReLU classifier, a softmax classifier, a sigmoid classifier, or the like and may output a map of module centroids 832 and an intensity map 834.

With a continued reference to FIG. 8, the locations of module centroids (e.g., coordinates of pixels associated with the centers of identified modules) may be used for identification of an actual (regular) grid of modules of the barcode that is captured in barcode image 802. In particular, because of defects in the affixation of the barcode to a host object, imaging imperfections and aberrations, and so on, the locations of module centroids may be viewed as candidate (seed) locations of modules that are subject to mapping to actual location of a regular (e.g., square grid of modules).

Figure 11:
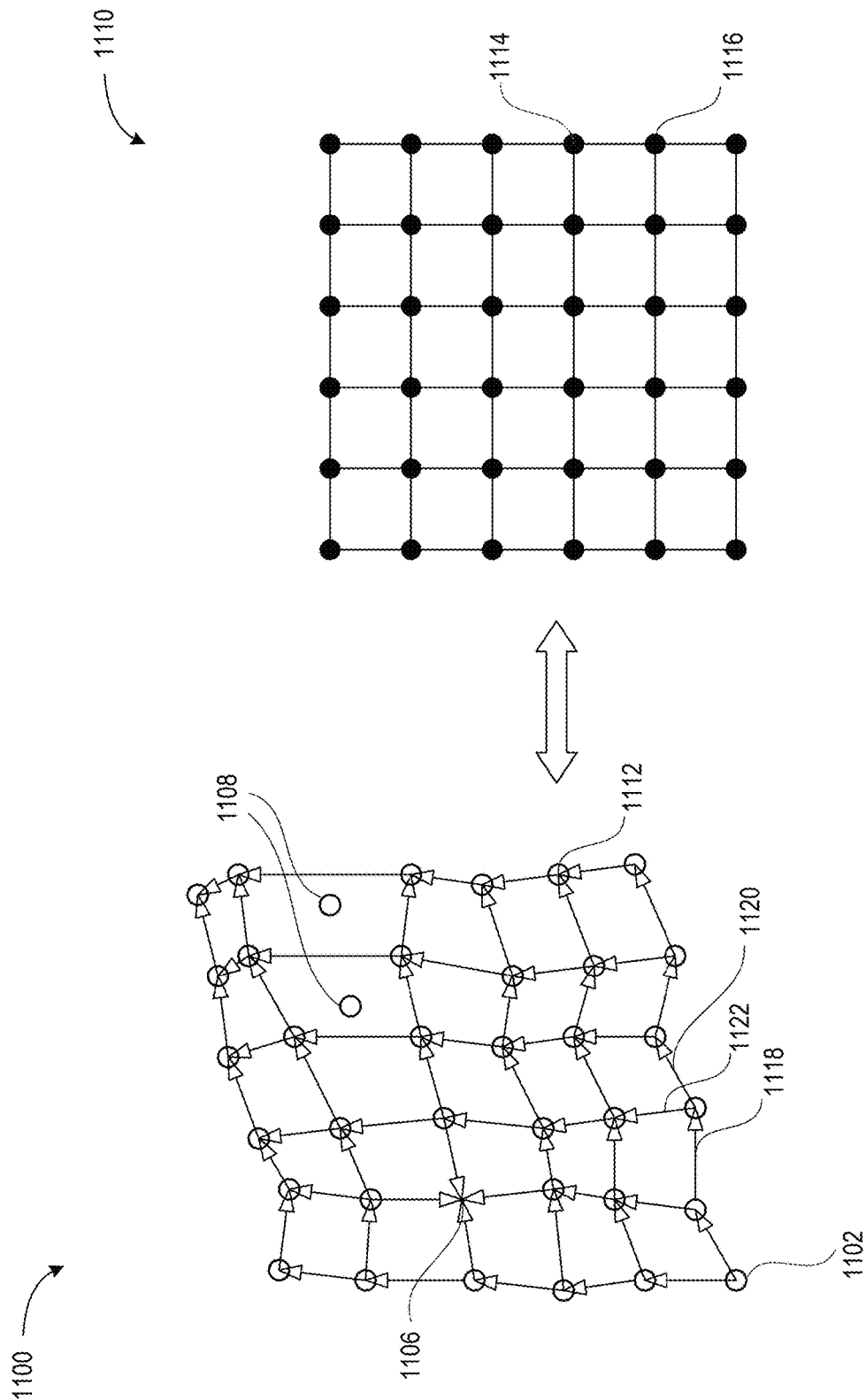
FIG. 11 illustrates mapping of a set of candidate locations of modules, as may be output by a neural network, to a grid of modules of the barcode, in accordance with some implementations of the present disclosure.

FIG. 11 illustrates mapping of a set of candidate locations 1100 of modules, as may be output by a neural network, to a grid of modules 1110 of the barcode, in accordance with some implementations of the present disclosure. Each candidate location 1102 is indicated with a small white circle. Grid identification 840 may map various candidate locations of modules of the set of candidate locations 1100 to appropriate grid positions of the grid of modules 1110. In some instances, the barcode image may be significantly deformed so that merely overlaying the set of candidate locations 1100 over the grid of modules 1110 would lead to an incorrect mapping. For example, such an overlaying would predict that candidate location 1112 is associated with a grid position 1114 whereas the correct mapping it to a different grid position 1116. Additionally, some candidate locations, e.g., location 1106, may be missed by the neural network 830 while some candidate locations, e.g., locations 1108, may be spurious artifacts. Similarly, various clustering techniques may be inefficient because of the presence of clusters of candidate locations of complex shapes. To identify correct mappings, restore missing modules, and eliminate spurious modules, grid identification 840 may perform local crawling starting from one or more seed candidate locations, and sequentially identifying correct mappings. For example, as illustrated in FIG. 11, crawling may start from a reliably determined candidate location, which may be an edge or a corner module of the barcode (e.g., the bottom left corner of the barcode), a module of a finder pattern, or a module of any other recognized pattern of the barcode, or any other reliably determined module of the barcode. Crawling or tracking may be performed by identifying multiple neighboring candidate locations (as depicted with arrows in FIG. 11) and determining the most likely grid position among such candidate locations. Since local deformations may be expected to evolve (increase or decrease) slowly on the scale of individual modules, it may be expected that various rows and columns of the grid of modules 1110 are mapped on subsets of locations that generally follow similar directions with some small local variations. Therefore, when tracking a particular row (or column) of the grid of modules 1110, each subsequent candidate location added to the row (column) may be expected to be within a certain small range of directions (angles) from the previous directions of tracking. For example, during tracking of the bottom row of the grid of modules 1110, a tracking step 1118 may be followed with a step 1120 that has a direction that is close to that of step 1118 and may favor that direction compared with the direction of another possible step 1122 (that is associated with a larger angle change).

In some implementations, individual rows and/or individual columns of the grid of modules 1110 may be tracked and constructed. As described above, tracking may attempt to extend a portion of the grid previously tracked, by choosing the most suitable candidate locations within a narrow interval of angles and distances. The acceptable intervals of distances may be determined based on the known module size (as estimated previously during module size determination 820) and a certain error tolerance (e.g., 20%, 30%, etc.) may be added to the known module size. If no suitable next tracking step is found for a given candidate location, the tracking may end for that particular location.

In many instances of small image imperfections, grid identification 840, performed as described above, may be sufficient to identify all grid positions of the grid of modules 1110. In such instances, the fully identified grid of modules may, at block 850, be assigned a particular color, as specified in the intensity map 834, output by the second classification head of the neural network 830.

In some instances, as a result of large image imperfections, some rows and columns of the grid of modules 1110 cannot be identified fully and the tracking (crawling) process may produce a number of successfully tracked fragments of rows/columns. Subsequently, a final barcode construction may be performed as part of block 850 of FIG. 8, as described in more detail below in conjunction with FIG. 12.

Figure 12A:
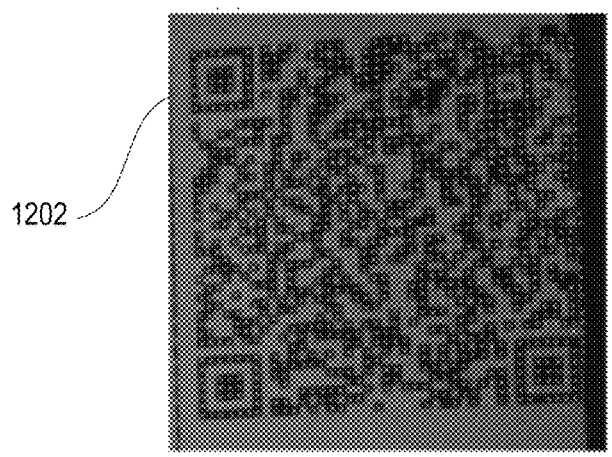
FIGS. 12A-E illustrate establishing associations between connected fragments of candidate locations of modules mapped to grid positions of the underlying barcode, in accordance with some implementations of the present disclosure.
Figure 12B:
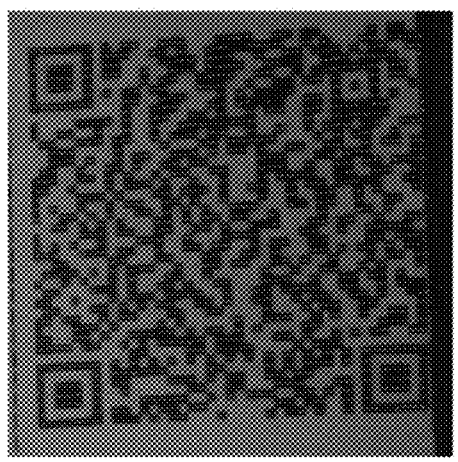
Figure 12C:
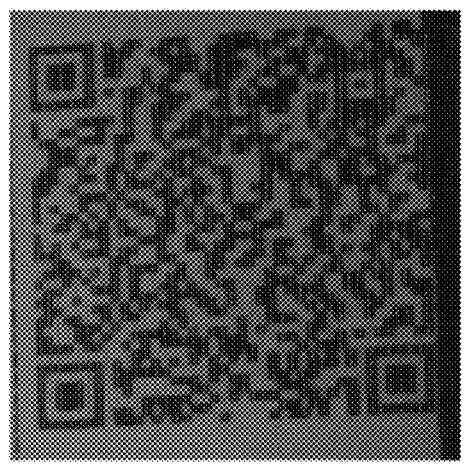

FIGS. 12A-E illustrate establishing associations between connected fragments of candidate locations of modules mapped to grid positions of the underlying barcode, in accordance with some implementations of the present disclosure. FIG. 12A illustrates an output 1202 of the neural network 830 that includes a map of centroids of candidate locations of modules (indicated with circles) as well as a binarized intensity map of detected modules. FIG. 12B illustrates tracked row fragments and FIG. 12C illustrates tracked column fragments obtained using output 1202, substantially as described above.

With a continued reference to FIG. 8, barcode construction 850 may use the obtained fragments to construct the full grid (e.g., grid of modules in FIG. 11). Barcode construction 850 may deploy any suitable greedy algorithm that performs local matching of fragments. Barcode construction 850 may involve using one direction (e.g., horizontal direction or vertical direction) as the primary direction of construction and the other direction (e.g., vertical direction or horizontal direction) as the secondary direction. In some implementations, barcode construction 850 may start from any given fragment tracked along the primary direction, e.g., a row fragment. A starting fragment may depend on the specific barcode type and may be a fragment identified as a part of a finder pattern or any other distinctive pattern of the barcode type, e.g., the black L-shaped finder pattern in the Data Matrix barcodes, the 9×9 black finder square of the Aztec barcodes, the corner 7×7 black finder squares in the QR barcodes, and so on. The barcode construction algorithm may then follow the row fragment until one or more intersections with column fragment(s) extending in the secondary directions are encountered. The column fragments are then followed along the secondary directions (e.g., up and/or down) to intersections with new row fragments, which are then added to the constructed grid and traveled along the primary directions (e.g., left and/or right). The process is continued until the full grid of modules is constructed.

Discrepancies between previously added fragments and newly encountered fragments (e.g., a different number of modules) may be resolved using various heuristics that may be established for that purpose. In some implementations, discrepancies may be resolved in favor of previously added fragments, in favor of newly encountered fragments, in favor of longer fragments, in favor of removing fragments that cause the largest number of discrepancies. As a result of the grid construction process, some old fragments may be removed while new fragments may be added.

Selection of primary directions and secondary directions may be performed in view of a degree of success in identification of various fragments during grid identification 840. For example, the direction that has the largest total number of modules in the fragments identified may be chosen as the primary direction. If the initial choice of the primary direction did not result in a successful barcode construction (e.g., missing modules in a number/fraction of grid positions exceeding a certain threshold), the primary and the secondary directions may be swapped and the application of the barcode construction algorithm may be repeated.

After the grid of modules has been constructed, a module associated with each grid position may be assigned an appropriate color, as specified in the intensity map 834 output by the second classification head of the neural network 830. Additionally, barcode construction 850 may perform further post-processing of the constructed barcode. The post-processing may include determining a proper orientation of the barcode, correcting boundaries of the barcode, interpolation (and/or extrapolation) of missing modules (grid positions). The post-processing may be performed based on the structure and characteristic patterns of a respective barcode type, e.g., finder patterns. For example, in the instance of a QR barcode, three 7×7 squares located at the corners of a barcode may be used to identify a correct orientation (among the four possible 90-degree rotations) of the barcode. Identification of finder patterns or any other patterns within the constructed barcode may be performed by overlaying the constructed barcodes with a barcode mask for the particular barcode type. The barcode mask may have any (e.g., arbitrary) data content and specification-defined patterns.

The degree to which the finder patterns of the constructed barcode match the corresponding areas of the barcode mask may be estimated using a suitable correlation coefficient CORR. In some implementations, the correlation coefficient may be computed according to the following formula:

$$\text{CORR} = \frac{1}{D} \sum_{k,m} CONF(k, m) \times \begin{cases} +1, & I(k, m) = I_{REF}(k, m). \\ -1, & I(k, m) \neq I_{REF}(k, m), \end{cases}$$

where the sum extends over the modules (enumerated with horizontal index k and vertical index m) of the patterns (e.g., finder patterns) whose overlap in the constructed barcode and the barcode mask is being evaluated, I(k, m) is the binarized (0 or 1) module intensity generated by the intensity map classifier of the neural network 830, $I_{REF}$ (k, m) is the corresponding module of the barcode mask, and D is the total number of modules in the patterns. Confidence value CONF(k, m) characterizes the confidence with which the neural network 830 determines the binary intensity I(k, m) for the module (k, m). In some implementations, the confidence value CONF(k, m) may be an additional output of the intensity map classifier of the neural network 830. The correct orientation of the constructed barcode may be determined by a maximum correlation value CORR for various orientations of the barcode. Additionally, the identified patterns may be used for removing spurious module artifacts and correcting barcode boundaries.

Figure 12D:
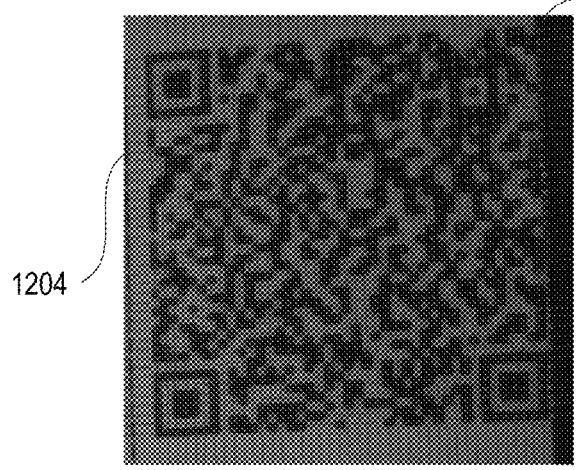
Figure 12E:
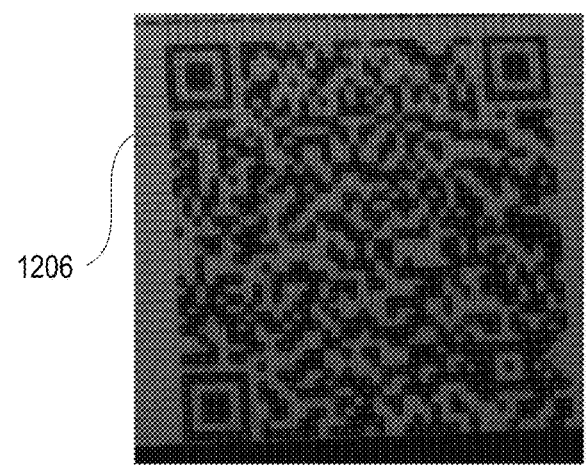

FIG. 12D illustrates a constructed grid 1204 of modules, and FIG. 12E illustrates a corrected grid 1206 of modules obtained substantially as described above. Specifically in this example, the corrected grid 1206 is rotated by 90 degrees clockwise relative to the constructed grid 1204. Additionally, a column 1208 of spurious modules present in the constructed grid 1204 along the boundary of the barcode is removed in the corrected grid 1206. The removal of the column 1208 may be performed based on the fact that no row or column of modules may extend beyond the outer frame of the QR finder patterns.

In some instances, after identification of the barcode patterns, some additional operations may be performed to identify boundaries of the barcode. For example, Aztec barcodes have a finder pattern located at the center of the barcode. Correspondingly, identification of the finder pattern may not, in itself, determine the boundaries of the barcode. To perform correction of boundaries in such instances, the data that determines the size of the barcode (in modules) may first be extracted from the constructed barcode and then used to obtain the corrected barcode (e.g., to trim the barcode at its true boundaries).

In some instances, the true boundaries of the barcode identified from the patterns (or based on the sizing data extracted from the barcode) may indicate that one or more rows or columns of modules may be missing. The missing modules may be restored using various extrapolation or interpolation techniques, e.g., linear extrapolation or interpolation. In some implementations, the missing modules may be restored using random intensity values (e.g., 0 or 1) and corrected during error correction 860, e.g., using error correction regions of the barcode.

Error correction 860 may include the Reed-Solomon algorithm, or any other suitable error correction algorithm. Error correction 1480 may correct up to a certain number of incorrectly recognized modules/symbols. At block 870, decoding of the constructed and corrected (including using error correction) barcode may be performed to obtain a barcode value 880 encoded in the barcode.

In some instances, decoding of the barcode may be unsuccessful (block 890). Responsive to determination that the decoding is unsuccessful, barcode image 802 may be replaced with the intensity map 834 output of the neural network 830 and the module size determination 820 may be repeated, as indicated by the dashed arrow. After a new module size is determined, the operations of blocks 830-870 may be repeated. Such a backup option exploits higher stability of the intensity map 834 output of the neural network 830 channel compared with the module centroids 832 output channel. If the barcode decoding is still unsuccessful, the computing device performing barcode decoding may select another barcode type and attempt decoding for the new selected type, using a barcode mask for the new barcode type and a new set of barcode symbols.

Figure 13A:
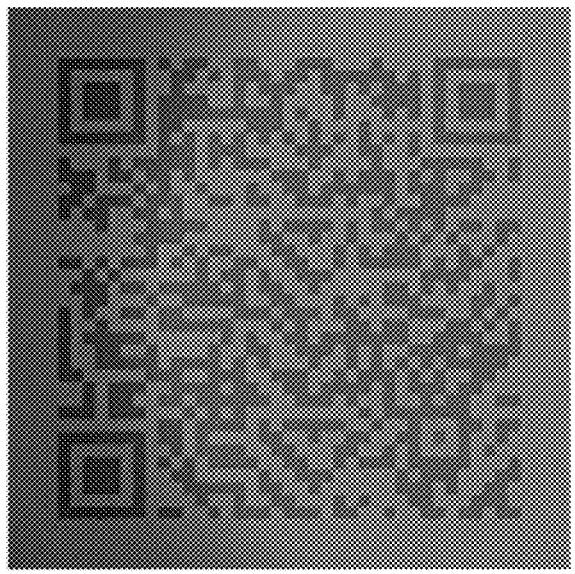
FIGS. 13A-D is an illustration of training images that may be used in training of the neural network of FIG. 11, in accordance with some implementations of the present disclosure
Figure 13B:
Figure 13C:
Figure 13D:
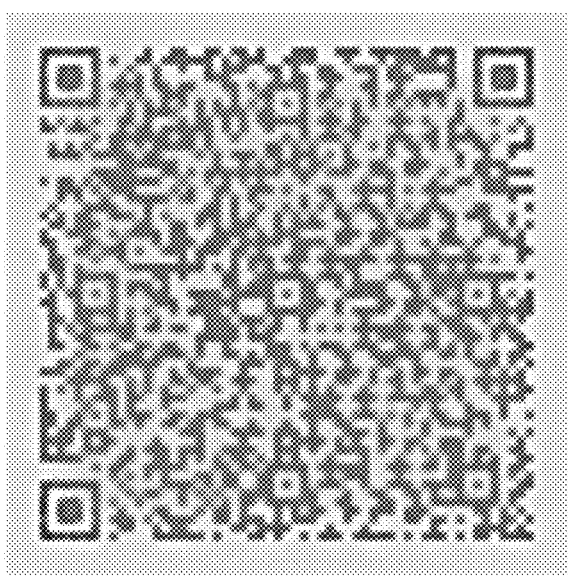

FIGS. 13A-D is an illustration of training images that may be used in training of the neural network of FIG. 11, in accordance with some implementations of the present disclosure. Any of the training images of FIGS. 13A-D may be synthetic images, e.g., images obtained by modifying any aspects of a real image or fully artificial images. FIG. 13A illustrates a barcode image with a non-uniform amount of illumination. FIG. 13B illustrates a darkened barcode image. FIG. 13C illustrates a barcode image with a glare. FIG. 13D illustrates a barcode image with a blur.

Figure 14:
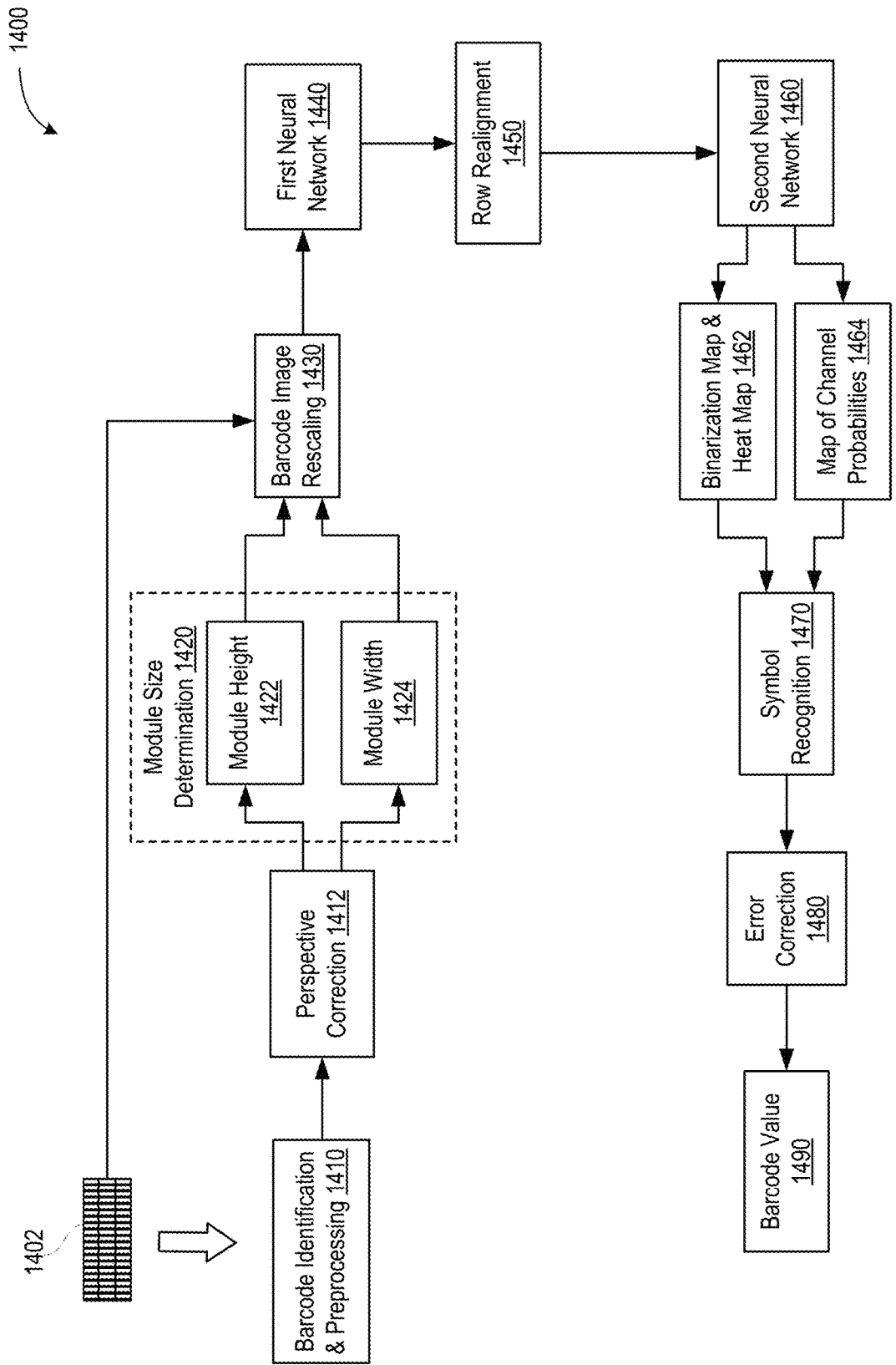
FIG. 14 illustrates example operations of processing images of stacked linear barcodes that are robust against unfavorable conditions and various image imperfections, in accordance with some implementations of the present disclosure.
Figure 15A:
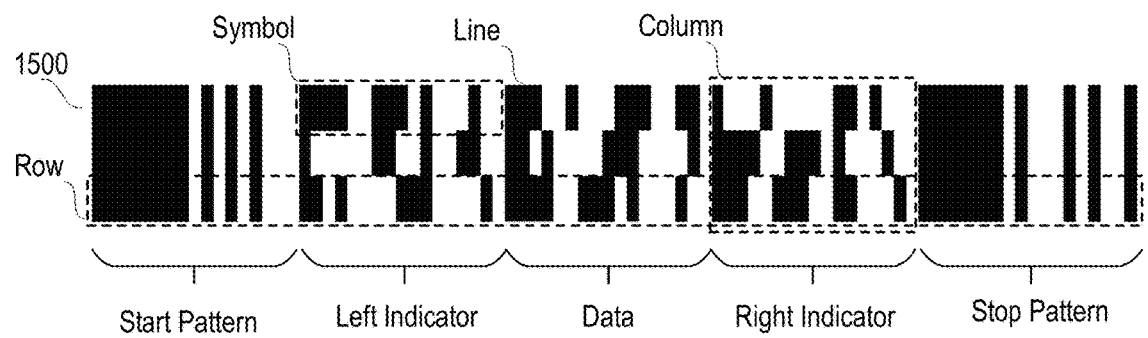
FIG. 15A illustrates the geometry of the PDF417 barcode.

FIG. 14 illustrates example operations 1400 of processing images of stacked linear barcodes that are robust against unfavorable conditions and various image imperfections, in accordance with some implementations of the present disclosure. Example operations 1400 will be illustrated with references to FIGS. 15-17, which highlight various aspects of processing. In some implementations, example operations 1400 may be performed using example computer system 100 of FIG. 1. Stacked linear barcodes may include multiple rows stacked one on top of another, each row independently encoding multiple symbols. For the sake of specificity and ease of illustration, the description below uses PDF417 barcodes as an example, but other stacked linear barcodes may be processed similarly. Each symbol may have a fixed length, e.g. 17 modules for PDF417 barcodes. As illustrated in FIG. 15A, the 17 modules may be grouped into 4 black lines and 4 white lines, each line made of 1, 2, 3, 4, 5, or 6 modules. Each symbol may begin with a black module and end with a white module. A stack of symbols makes up a column. Because each symbol begins with a black module and ends with a white module, the start of each column of symbols is marked with a transition from a white line to a black line and the end of each column of symbols is marked with the reverse transition from a black line to a white line. The columns of symbols are enclosed by a start pattern on the left and an end pattern on the right, which are intended to indicate the correct orientation of the barcode. The start pattern and the end pattern are uniform across different rows. For example, the start pattern may be 81111113 (where odd/even numbers indicate the width of the respective lines in modules) and the stop pattern may be 711311121. The height of the module (which is also the height of a row) is usually at least three times larger than the width of the module. The first and the last columns of symbols (located next to the start pattern and the stop pattern, respectively) are known as left and right indicators and include various global descriptors, such as the number of rows and columns of symbols in the barcode, identifiers for various symbol encoding tables that are used in symbols of various rows, and so on. The columns of symbols confined between the left indicator and the right indicator encode actual barcode data also known as data codewords. As described in detail below, correct decoding of a barcode (which may be represented by images of varying quality) involves identifying rows of the barcode, segmenting rows into symbols, decomposing symbols into black and white lines, and decoding symbols based on the obtained lines.

A stacked linear barcode image 1402 may undergo barcode identification and preprocessing 1410, including cropping the barcode image 1402 from a document or an image or a product, advertising materials, and the like. Barcode identification and preprocessing 1410 may further enhance quality of barcode image 1402 (e.g., using de-blurring, filtering, sharpening, etc.) and identifying orientation of the barcode, e.g., directions of the sides of the barcode. For example, the barcode may be oriented such that the lines of the start pattern and the stop patterns are parallel to a reference direction, referred to as the vertical direction herein.

Figure 15B:
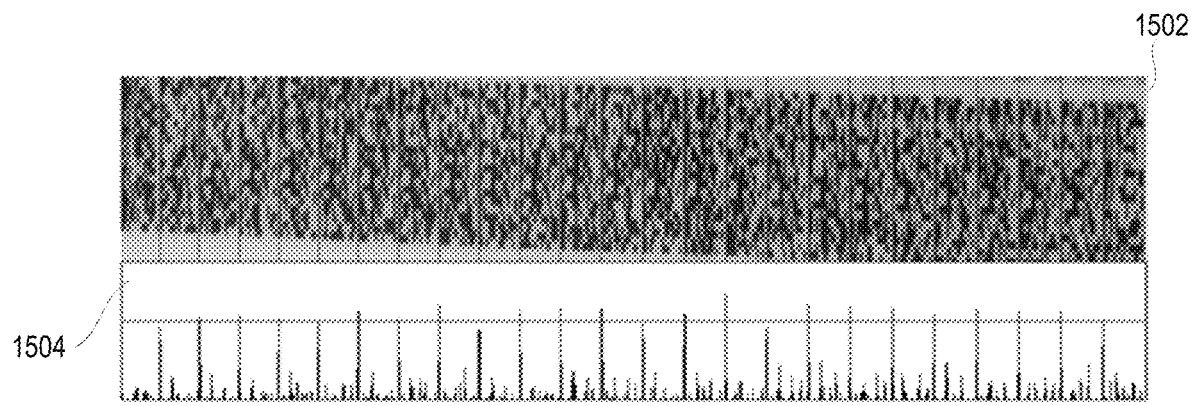
FIG. 15B illustrates a tilt of rows in an example PDF417 barcode image of a stacked linear barcode after correcting vertical perspective, according to some implementations of the present disclosure.

The barcode may also undergo perspective correction 1412, to improve vertical perspective. More specifically, due to an unfavorable location of a vantage point used for acquiring the barcode image, the lines of the start and the stop pattern may not be fully parallel. To address such misalignment, a perspective correction 1412 may be performed using a Hough transform or any similar transform. More specifically, the Hough transform may identify, based on pixel coordinates of various points of reference lines (e.g., thin, single module-wide lines of the start/stop patterns), the equations (e.g., y=ax+b) of the reference lines. The equations of the reference lines may then be used to identify an intersection point (the vanishing point) of the reference lines. By finding a transform that takes the vanishing point to infinity, the reference lines may be straightened. Such a transformation corrects the vertical perspective of the barcode image, but does not necessarily correct the horizontal alignment. In particular, rows of symbols need not be perpendicular to the new reference lines and may have a tilt (slope). FIG. 15B illustrates a tilt of rows in an example PDF417 barcode image 1500 of a stacked linear barcode after correcting vertical perspective, according to some implementations of the present disclosure.

The barcode image with corrected vertical perspective may undergo module size determination 1420. Unlike typical modules of 2D barcodes, modules in a stacked linear barcode have the module height that is different from (and may be significantly larger than) the module width. Determination of module height 1422 may be performed using a histogram of lengths of white and black connected vertical pixel groups (lines). More specifically, the barcode image may be scanned along different pixel lines in the vertical direction and the number of pixels in continuous black and/or white lines may be counted. The number of times N(n) each horizontal and or vertical line of length n (in pixels) appears in the barcode image may then be determined. Because different rows encode different symbols, the majority of the pixel lines extend over a single row. Correspondingly, maxima of the histogram N(n) may correspond to the module height. Under ideal conditions, the histogram N(n) may have a single strong maximum. Under less favorable conditions (e.g., poor image quality, image binarization artifacts, etc.), different rows may have different heights, giving rise to more than one maximum. In some implementations, multiple maxima $n_1$, $n_2$ . . . of the histogram N(n) may be considered and the module height may be estimated by taking the average of the maxima $n_1$, $n_2$ . . . . In some implementations, the obtained maxima may be averaged by weighting the values $n_1$, $n_2$ . . . with the corresponding numbers of times such maximum values are encountered, $N(n_1)$, $N(n_2)$ . . . . It should be understood that numerous other heuristics may be used to estimate the height of the module. In some implementations, separate maxima may be obtained for white pixel lines and for black pixel lines and the module width may be taken as the average of the two maxima. In some implementations, to improve perspective compensation, separate module height estimates may be obtained for different parts of the barcode image, e.g., separately for the top portion and the bottom portion of the barcode image. The top portion and the bottom portions may be identified based on the length of pixel lines in the start pattern and the stop pattern; these lines run across the entire height of the barcode and may be used to estimate the height of the barcode in pixels and to divide the barcode into two or more portions.

Determination of module width 1424 may be performed using a histogram of aggregated (e.g., summed or averaged), along the vertical direction, pixel intensities $I_{jk}$, e.g., $H_j = \Sigma_{k=1}^{N} I_{jk}$. The histogram $H_j$ 1504 for the example barcode image 1502 is illustrated in FIG. 15B. Because the first line (a single-module or multi-module line) of each symbol in each column is black and the last line of each symbol is white, the start of each column is marked with a transition from a white line (the end of a previous column) to a black line (the beginning of the next column). Correspondingly, module width 1424 determination may identify symbol boundaries by detecting maxima of the discrete gradients $H_j-H_{j-1}$ (and may also discard maxima related to the start and stop patterns). After the boundaries of symbols are identified, the module width may be determined in view of the determined width of one or more columns. For example, if the width of N columns is $W_N$ pixels and there are m (e.g., m=17) modules per column/symbol, the module width (in pixels) may be determined as $a=W_N/(m \cdot N)$. In some implementations, to take into account a possible non-uniform imaging of the barcode along the horizontal direction, separate module widths may be obtained for two or more different parts of the barcode image, e.g., separately for the left half and the right half of the barcode image.

With a continuing reference to FIG. 14, at block 1430, the barcode image may be rescaled using the determined module height and module width so that the rescaled barcode image has the module dimensions (height and width) that match the dimensions of the module used for training neural networks that are used in barcode image decoding, as described in more detail below.

Figure 15C:
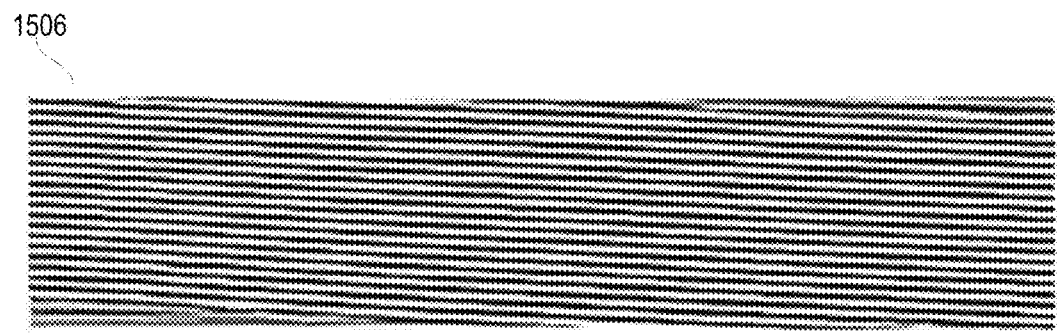
FIG. 15C illustrates a mask of rows produced by a neural network after processing the example barcode image of FIG. 15B, according to some implementations of the present disclosure.

The rescaled barcode image may be processed by a first neural network 1440 that outputs a mask of rows of the barcode image. FIG. 15C illustrates a mask of rows 1506 produced by a neural network after processing the example barcode image 1500 of FIG. 15B, according to some implementations of the present disclosure. The first neural network 1440 may output a segmented map of the barcode image, in which central regions of rows are represented with pixels of a first color (e.g., black pixels) and boundary regions of rows are represented with pixels of a second color (e.g., white pixels). The boundary regions may have a height of one or more pixels along the vertical direction.

Figure 16A:
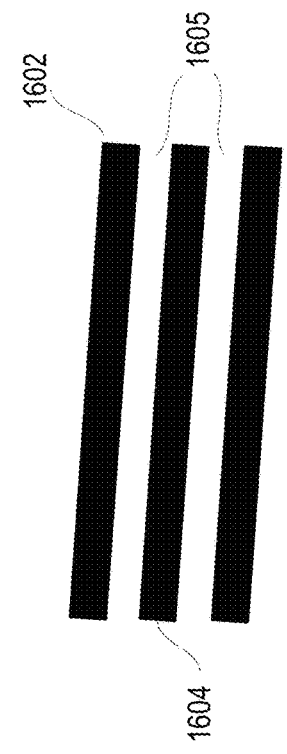
FIGS. 16A-F illustrate post-processing of a barcode image based on an output of the first neural network of FIG. 14, in accordance with some implementations of the present disclosure.
Figure 16B:
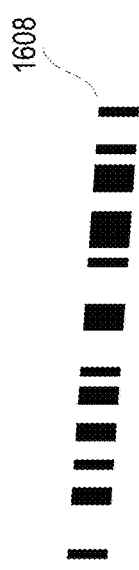
Figure 16C:
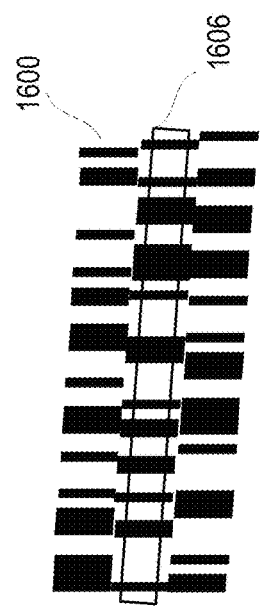
Figure 16D:
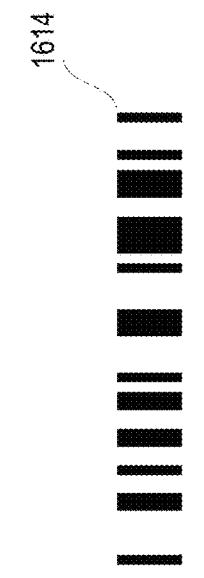

FIGS. 16A-F illustrate post-processing of a barcode image based on an output of the first neural network 1440 of FIG. 14, in accordance with some implementations of the present disclosure. FIG. 16A illustrates a schematic depiction of a portion of a barcode image 1600 and FIG. 16B illustrates a map of rows 1602, as may be output by the first neural network 1440. The map of rows 1602 identifies central regions of various rows of the barcode with black pixels and boundary regions between the rows with white pixels. For example, FIG. 16B depicts a central region 1604 of the middle row and the boundary regions 1605, as may be generated by the first neural network 1440. The boundary regions 1605 help to separate the central region 1604 from the adjacent rows of the barcode image 1600. As illustrated in FIG. 16C, a mask 1606, which corresponds to the outline of the central region 1604, may be superimposed (overlayed) over the barcode image 1600. As illustrated in FIG. 16D, the central region 1608 of the middle row, defined by mask 1606, may be cut from the barcode image 1600. The central region 1608 may undergo row realignment 1450 (with a reference to FIG. 14) to improve alignment of rows in the vertical direction.

Figure 16E:
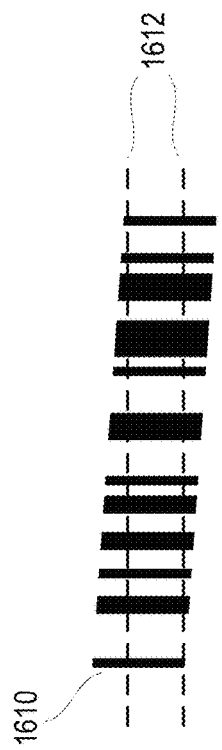
Figure 16F:
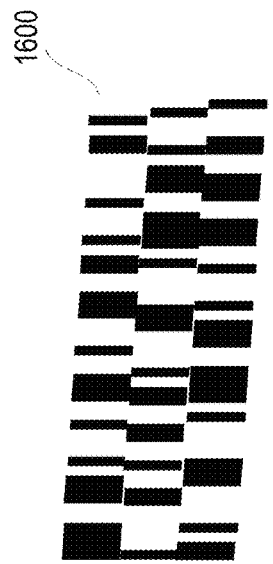

In one implementation, as illustrated in FIG. 16E, the central region 1608 may be expanded (rescaled) along the vertical direction to obtain an expanded central region 1610. One or more horizontal cuts 1612 may be applied to the expanded central region 1610 to trim a middle portion 1614, as illustrated in FIG. 16F. The middle portion 1614 may be obtained for each row and may be used as an input into a second neural network, e.g., second neural network 1460 of FIG. 14. It should be understood that multiple variations of the techniques illustrated in FIG. 16 may be used. In some implementations, in place or in addition to rescaling and trimming of expanded central region 1610, realignment of various lines in the expanded central region 1610 may be achieved by shifting various portions of the central region 1608 in the vertical direction. For example, various portions of the central region 1608 may be shifted so that the top (or bottom) boundaries of the expanded central region 1610 are aligned. The bottom (or top) boundaries may then be trimmed using a single horizontal cut. In some implementations, the trimmed middle portion 1614 may have the same height (in pixels) as the height of a single row in the barcode image 1600.

With a continued reference to FIG. 14, the second neural network 1460 may process the trimmed and aligned middle portions of each row to output one or more representations of the respective row. In some implementations, the second neural network 1460 may process rows individually. In some implementations, the second neural network 1460 may process all rows simultaneously. In some implementations, one output channel of the second neural network 1460 may include a one-dimensional binarization map and a heat map (block 1462) for each row. The binarization map may be a map of black pixels (intensity 0) and white pixels (intensity 1). The heat map may indicate pixel intensities in smaller increments, e.g., any fraction of full intensity, such as 0.1, 0.01, 1/256, or any other suitable increments.

Another output channel of the second neural network 1460 may include a map of channel probabilities 1464 that classifies various candidate lines of each row among possible widths classes and among possible line color classes. More specifically, in the instance of PDF417 barcodes, the second neural network 1460 may classify each line among 12 available classes: 6 classes associated with black lines (of width 1 module, 2 modules, . . . 6 modules, e.g., as defined in the PDF417 specification) and 6 classes associated with white lines. Under successful operations of the second neural network 1460, each symbol may be identified as a sequence of 4 black lines and 4 white lines.

The first output (binarization) channel of the second neural network 1460 may be used to improve segmentation of the rows into symbols (during symbol recognition 1470), which may have been initially performed (e.g., using the intensity histogram) as part of module size determination 1420. The binarization output of the second neural network 1460 allows to obtain improved symbol boundaries in the vicinity of symbol boundaries determined from the intensity histogram. The identified boundaries may then be used for the final segmentation of each row into symbols.

Symbol recognition 1470 may first identify indicator columns (e.g., left indicator and right indicator) that include metadata characterizing the barcode encoding. For example, encoding of symbols may use multiple (e.g., two, three, or any other number) tables of symbols. During recognition of indicator columns, symbol recognition 1470 may perform identification of a specific table used for encoding of symbols of indicator columns, e.g., by consecutively trying out symbols from multiple tables. After a specific table is identified for a particular row, using the indicator columns of symbols, this identified table may then be used for a subsequent identification of data symbols, e.g., by matching various symbols of the identified table with symbols of the row.

Each symbol may be recognized independently of other symbols. Rows may be segmented into symbols using the binarization map and/or the heat map obtained as part of block 1462; separate lines may be identified as connected modules/pixels of the same color. If the resulting number of lines is different from the number defined in the barcode specification (e.g., four black lines and four white lines for PDF417 barcodes), the lines of a specific symbol may be modified. For example, if an odd number of lines has been detected, e.g., four black lines and three white lines, it is likely that the last white line of the symbol has been incorrectly assigned to the next symbol. Accordingly, symbol recognition 1470 may take the white line from the next symbol and add this white line to the current symbol. If two lines, e.g., a black line and a white line, are missing, symbol recognition 1470 may identify a line (black or white) having the intensity that is the closest to a threshold intensity (e.g., 0.5, or any other value, e.g., an average intensity value of the barcode image) and split the identified line into three lines. For example, if three black lines and three white lines have been determined by the second NN 1460, symbol recognition 1470 may include identifying that black line #2 has an average intensity of 0.36, which may be the highest average intensity of all three identified black lines. Symbol recognition 1470 may further identify that a middle portion of black line #2 has the highest average intensity, e.g., 0.45, and may segment this middle portion into a new white line with two black lines on the sides of the middle portion, thus bringing the total number of lines of each color in the symbol to four.

After the lines in a given symbol have been identified, symbol recognition 1470 may evaluate a likelihood that the identified lines correspond to various reference symbols. Each reference symbol may be assigned a respective probability characterizing a likelihood that the reference symbol matches the symbol being evaluated. In some implementations, this probability may be obtained as follows: each line of the reference symbol may be compared to the corresponding identified line of the symbol being evaluated and a probability (confidence level) that the line belongs to a certain length and color may be determined using the map of channel probabilities 1464, as described in more detail below in conjunction with FIG. 17.

Figure 17:
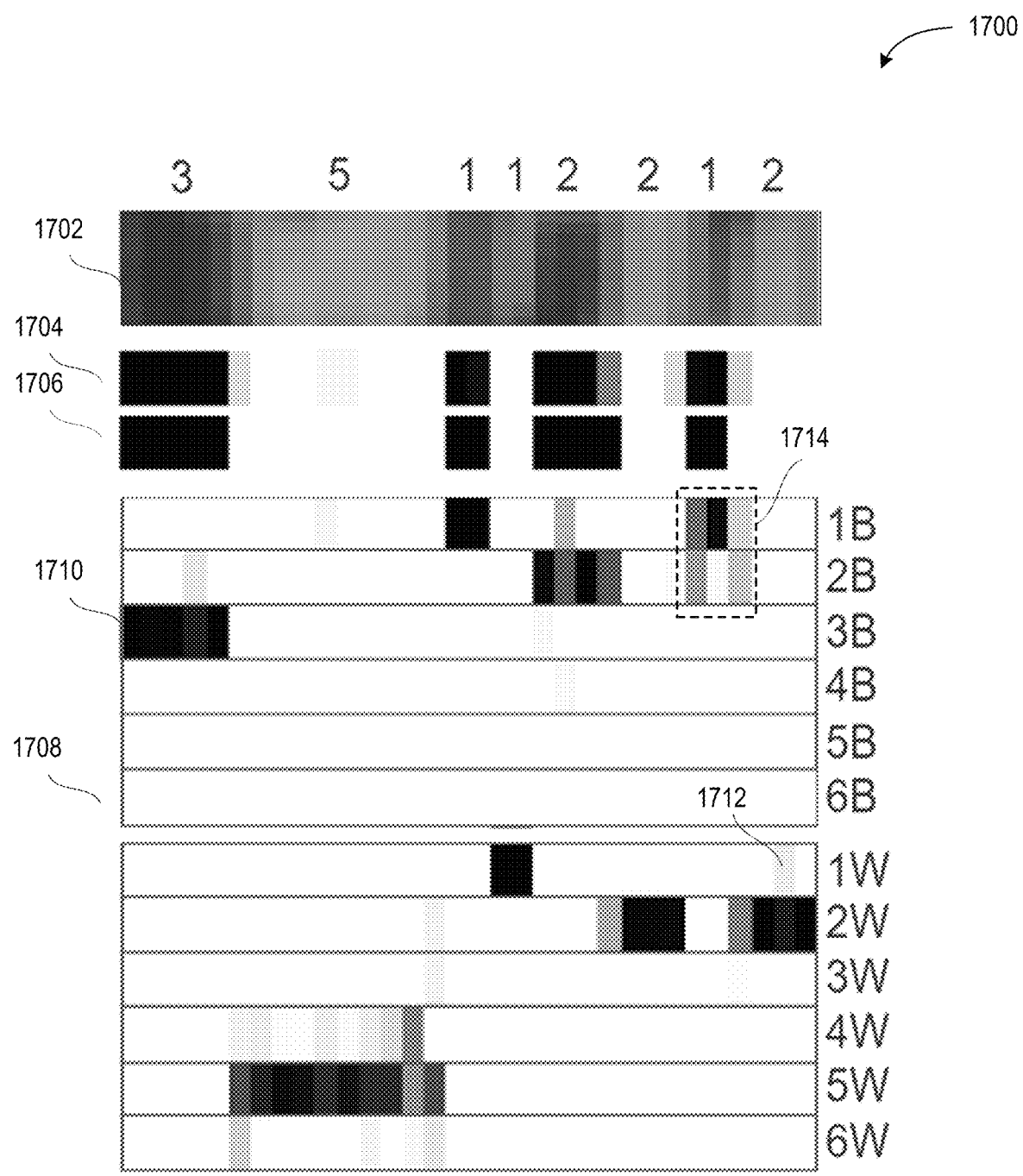
FIG. 17 illustrates the use of an output of the second neural network of FIG. 14 during symbol recognition of symbols in stacked linear barcodes, in accordance with some implementations of the present disclosure.

FIG. 17 illustrates the use of an output 1700 of the second neural network of FIG. 14 during symbol recognition of symbols in stacked linear barcodes, in accordance with some implementations of the present disclosure. FIG. 17 illustrates recognition of a symbol 35112212 (the numbers indicate the width, in modules, of alternating black and white modules) represented as a symbol image 1702, which may be a segmented (single symbol) portion of a specific row of a barcode image. The symbol image 1702 may be processed by the second neural network 1460 together with other symbols of the same row (or symbols of multiple rows). The output of the second neural network 1460 may include a heat map 1704, which may indicate pixel intensities (e.g., in increments of 0.1, 0.01, or any other suitable increments) assigned by the second neural network 1460 to various regions of the symbol image 1702. The heat map 1704 may be used to generate a binarization map 1706, with intensities below a certain threshold (e.g., 0.5) converted to black pixels (intensity 0) and pixels with intensities above the threshold converted to white pixels (intensity 1). The output of the second neural network 1460 may include a channel probability map 1708. In one illustrative example, the channel probability map 1708 may have a geometrical dimension (e.g., horizontal axis, as shown) associated with pixels of the symbol image 1702, and a channel dimension (e.g., the vertical axis, as shown). The channel dimension spans, as illustrated, six black channels, 1B . . . 6B, and six white channels 1W . . . 6W. Each channel is associated with a black (B) or white (W) line having the width indicated by the corresponding numeral. Black or gray rectangles in the channel probability map represent the probability (or confidence levels of identification) that various regions in the symbol image 1702 belong to the corresponding line. For example, a black rectangle 1710 indicates that the probability of the first three modules of the symbol image 1702 belonging to a line 3B (e.g., a black line with three modules) is large. Similarly, a light grey rectangle 1712 indicates that the probability of the second to the last module of symbol image 1702 belonging to a line 1W (e.g., a single-module white line) is smaller but non-zero. A group of rectangles 1714 indicates the probability that the corresponding (three) modules belong to various 1W lines or 2W lines.

With a continued reference to FIG. 14, each reference symbol may be superimposed over the channel probability map 1708. For example, a symbol 42311312 may be superimposed over channels 4B, 2W, 2B, 1W, etc., and the probabilities $P_{4B}$, $P_{2W}$, $P_{3B}$, $P_{1W}$ may be obtained from the channel probability map 1708. More specifically, the probability $P_{4B}$ may indicate the likelihood that the first four modules make up a first black line, the probability $P_{2W}$ may indicate the likelihood that the next two modules make up a first white line, and so on. Using the probabilities obtained for each line, an aggregated probability for the symbol may be determined, e.g., as an average of the probabilities for individual lines, $$P_{AGG} = \frac{1}{8}(P_{4B} + P_{2W} + P_{3B} + P_{1W} + \dots ),$$

or any other suitable aggregated probability (e.g., in which probabilities for individual lines are weighted with the number of modules in the corresponding line). The reference symbol associated with the largest aggregated probability may be selected as the most likely symbol.

After various symbols in the barcode image 1402 have been recognized, an error correction 1480 may be performed, which may include the Reed-Solomon algorithm, or any other suitable error correction algorithm. Error correction 1480 may correct up to a certain number of incorrectly recognized symbols. Subsequently, a barcode value 1490 may be obtained based on the recognized (and/or corrected) symbols using the specification (e.g., tables of symbols) for the specific barcode type.

Figure 18:
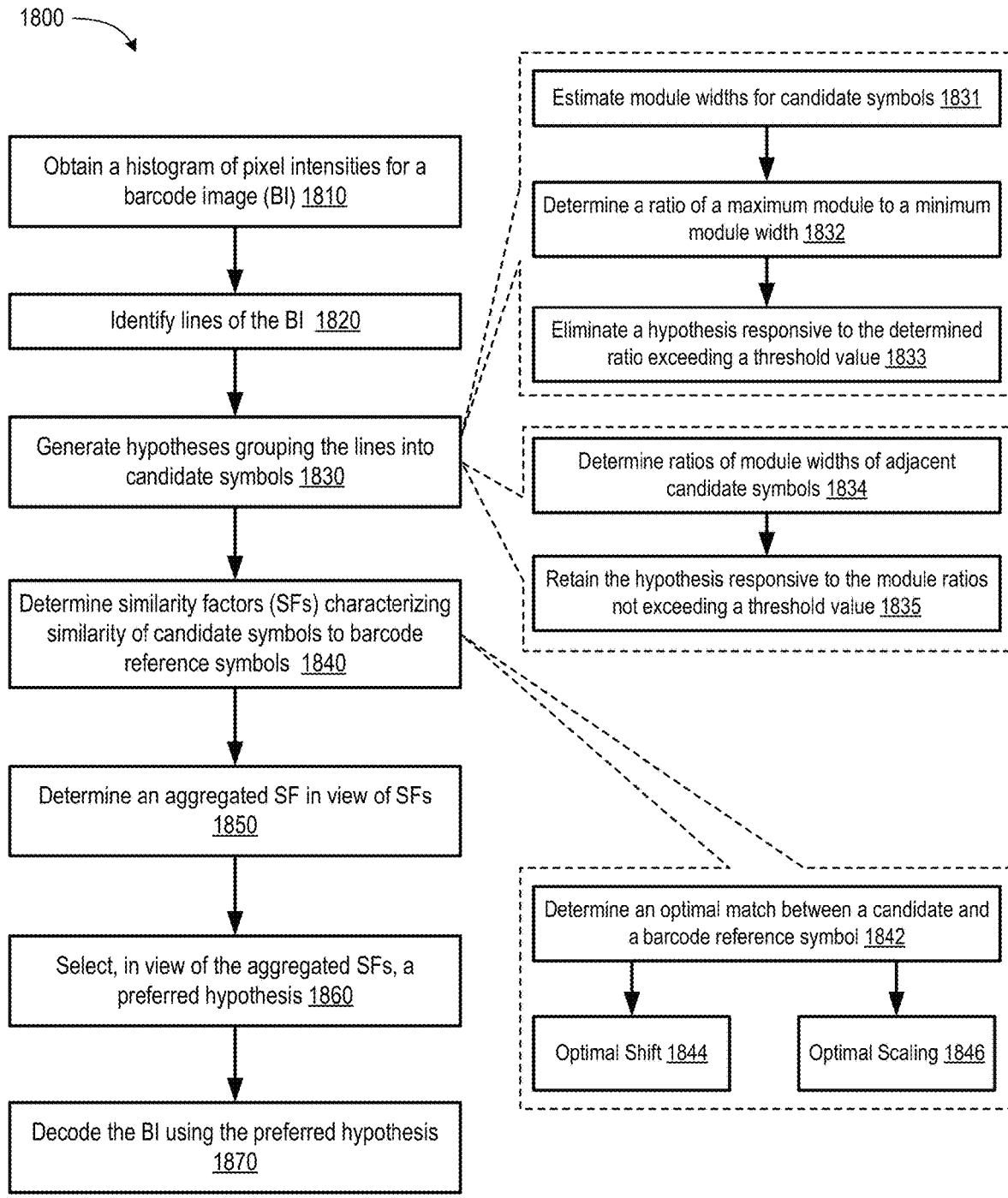
FIG. 18 is a flow diagram illustrating an example method of efficient and reliable decoding of linear barcodes under unfavorable conditions, in accordance with some implementations of the present disclosure.
Figure 19:
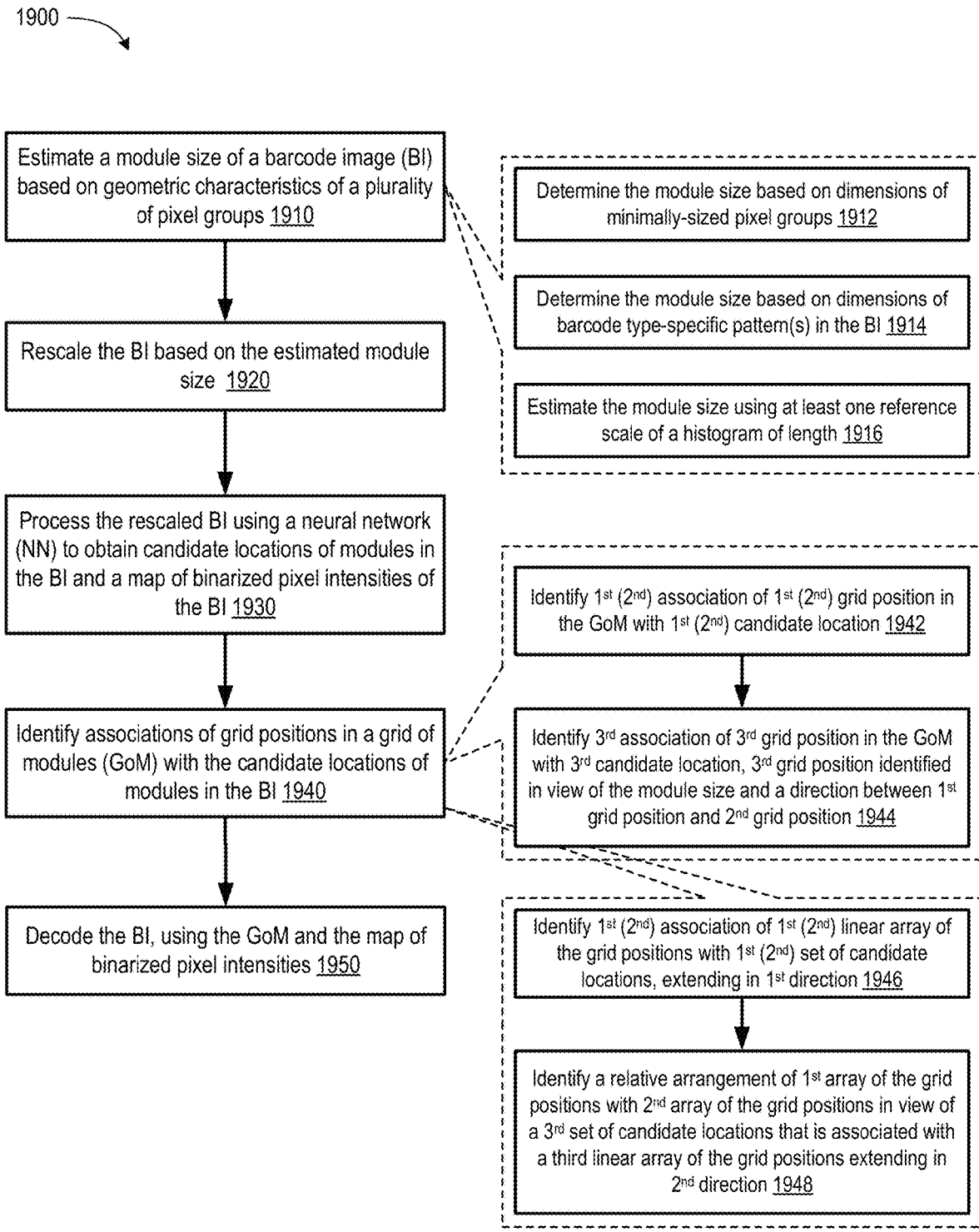
FIG. 19 is a flow diagram illustrating an example method of efficient and reliable decoding of two-dimensional barcodes under unfavorable conditions, in accordance with some implementations of the present disclosure.
Figure 20:
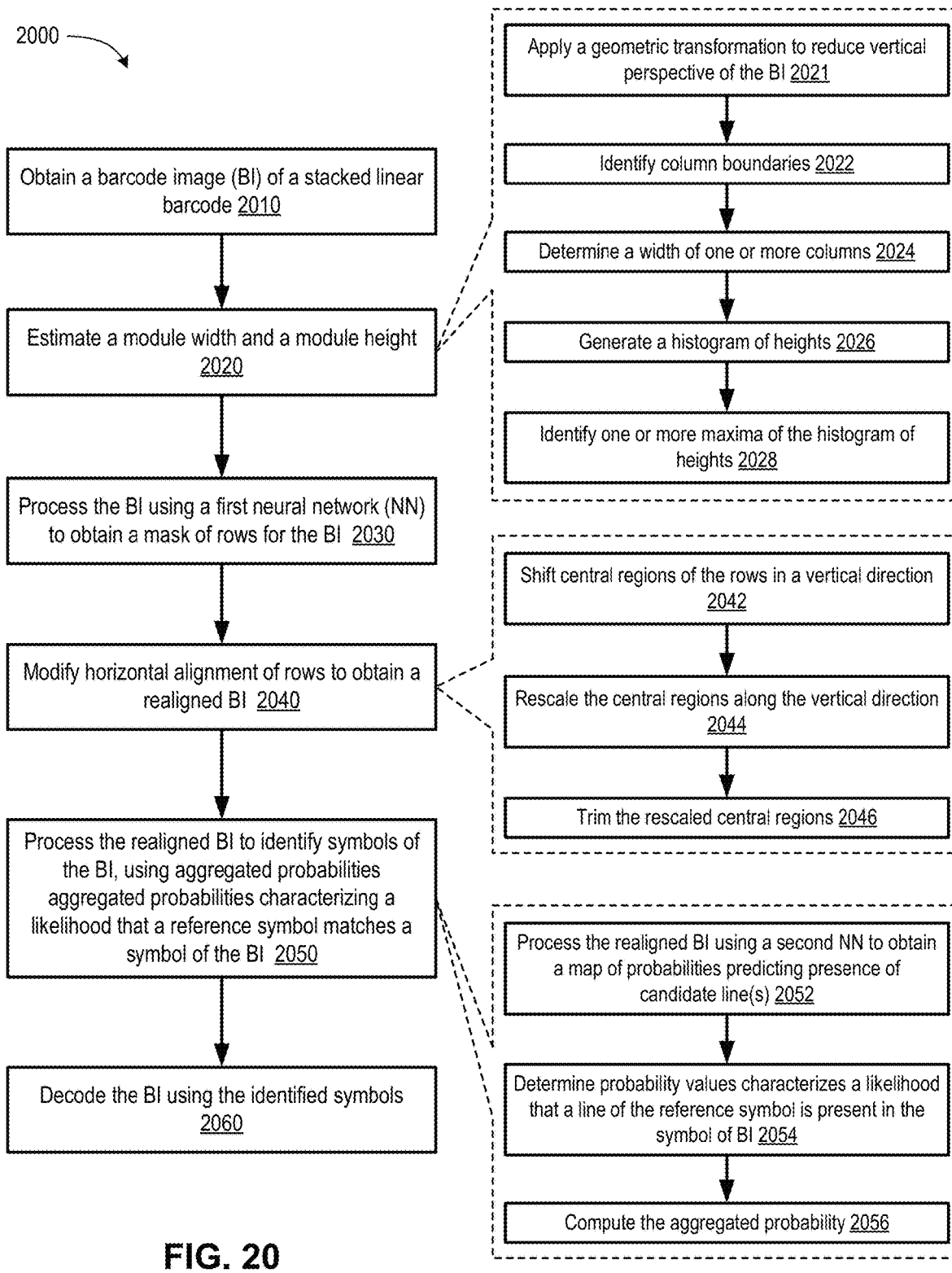
FIG. 20 is a flow diagram illustrating an example method of efficient and reliable decoding of stacked linear barcodes under unfavorable conditions, in accordance with some implementations of the present disclosure.

FIGS. 18-20 illustrate example methods 1800-2000 that can be used for detection and decoding of barcodes of multiple types. A processing device, having one or more processing units (CPUs) and memory devices communicatively coupled to the CPU(s), may perform methods 1800-2000 and/or each of their individual functions, routines, subroutines, or operations. The processing device executing methods 1800-2000 may be a processing device of computing device 110 of FIG. 1. In certain implementations, a single processing thread may perform methods 1800-2000. Alternatively, two or more processing threads may perform methods 1800-2000, each thread executing one or more individual functions, routines, subroutines, or operations of the methods. In an illustrative example, the processing threads implementing methods 1800-2000 may be synchronized (e.g., using semaphores, critical sections, and/or other thread synchronization mechanisms). Alternatively, the processing threads implementing methods 1800-2000 may be executed asynchronously with respect to each other. Various operations of methods 1800-2000 may be performed in a different order compared with the order shown in FIGS. 18-20. Some operations of methods 1800-2000 may be performed concurrently with other operations. Some operations may be optional.

FIG. 18 is a flow diagram illustrating an example method 1800 of efficient and reliable decoding of linear barcodes under unfavorable conditions, in accordance with some implementations of the present disclosure. At block 1810, a processing device performing method 1800 may obtain a histogram of pixel intensities for a barcode image (BI). The histogram may include a plurality of intensity values, each of the plurality of intensity values characterizing an appearance of a pixel column of a plurality of pixel columns of the BI (e.g., as described in conjunction with FIG. 3A). At block 1820, method 1800 may include identifying, based on the histogram, a plurality of lines of the BI (e.g., as described in conjunction with FIG. 3B). In some implementations, identifying the plurality of lines of the BI is performed using adaptive binarization.

At block 1830, method 1800 may continue with generating, by the processing device, one or more hypotheses. Each of the one or more hypotheses may group the plurality of lines into a plurality of candidate symbols (e.g., as described in conjunction with FIG. 4). In some instances, the one or more hypotheses may include a hypothesis with one or more lines of the BI removed. For example, the one or more removed lines may include a first line that is adjacent to a first edge of the BI (e.g., as described in conjunction with FIG. 4B and FIG. 4C). In some instances, the one or more removed lines may include a second line that is adjacent to a second edge of the BI (e.g., as described in conjunction with FIG. 4D). In some implementations, the one or more removed lines may be an internal line, e.g., a line that is not adjacent to an edge of the BI.

As illustrated with the top callout section in FIG. 18, in some implementations, evaluating viability of various generated hypotheses may include one or more of the following operations. At block 1831, the processing device may estimate a plurality of module widths. Each module width of the plurality of module widths may be estimated for a corresponding candidate symbol of the plurality of candidate symbols. At block 1832, evaluating viability of the a hypothesis may include determining a ratio of a maximum module width of the plurality of module widths to a minimum module width of the plurality of module widths, and eliminating, at block 1833, a responsive to the determined ratio exceeding a threshold value.

In some implementations, as illustrated with the middle callout section in FIG. 18, in evaluating viability of the respective hypothesis may include determining, at block 1834, a plurality of module ratios. Each of the plurality of module ratios may be a ratio of module widths of adjacent candidate symbols. At block 1835, method 1800 may include retaining a hypothesis responsive to the determined plurality of module ratios not exceeding a threshold value.

Validation of hypotheses performed as described in conjunction with blocks 1830-1835 may result in elimination of some of the generated hypotheses and retention of a subset of the generated hypotheses. At block 1840, method 1800 may include determining, for at least a subset of the one or more hypotheses, a plurality of similarity factors (SFs). Each SF may characterize similarity of a respective candidate symbol of the plurality of candidate symbols to one of a set of barcode reference symbols. As illustrated with the bottom callout section in FIG. 18, determining the SF of the respective candidate symbol and a barcode reference symbol may include a number of operations. More specifically, at block 1842, the processing device performing method 1800 may determine an optimal match between the respective candidate symbol and the barcode reference symbol (e.g., as described in conjunction with FIG. 5). More specifically, determining the optimal match may include at least one of: identifying an optimal relative shift between the candidate symbol and the barcode reference symbol (block 1844) or identifying an optimal relative scaling between the candidate symbol and the barcode reference symbol (block 1846).

At block 1850, the processing device performing method 1800 may determine an aggregated SF. The aggregated SF may be determined in view of the plurality of SFs for a specific hypotheses, e.g., a hypothesis that groups the plurality of lines of the BI image into a plurality of candidate symbols and identifies, for each candidate symbol, a potential match with a reference barcode symbol. At block 1860, method 1800 may continue with selecting, in view of the aggregated SFs determined for the subset of the one or more hypotheses, a preferred hypothesis (e.g., as described in conjunction of FIG. 6 and FIG. 7). At block 1870, method 1800 may continue with decoding the BI using the preferred hypothesis.

FIG. 19 is a flow diagram illustrating an example method 1900 of efficient and reliable decoding of two-dimensional barcodes under unfavorable conditions, in accordance with some implementations of the present disclosure. At block 1910, a processing device performing method 1900 may estimate a module size of a BI based on geometric characteristics of a plurality of pixel groups (e.g., as described in conjunction with FIG. 9). Each of the plurality of pixel groups may include one or more connected pixels of a first color (e.g., connected groups of black pixels). In some implementations, estimating the module size of the BI is further based on geometric characteristics of an additional plurality of pixel groups, each of the additional plurality of pixel groups including one or more connected pixels of a second color (e.g., connected groups of white black pixels).

In some implementations, estimating the module size may be performed using one or more of the techniques of the top callout section of FIG. 19. More specifically, at block 1912, the plurality of pixel groups identified by the processing device may include one or more minimally-sized pixel groups, e.g., the smallest squares (or rectangles) in the BI. Determining the module size may be based on dimensions of each of the one or more minimally-sized pixel groups (e.g., as described in conjunction with FIG. 9A and FIG. 9B).

At block 1914, the plurality of pixel groups may include one or more barcode type-specific patterns in the BI. Estimating the module size may include determining the module size based on dimensions of the one or more barcode type-specific patterns in the BI (e.g., as described in conjunction with FIG. 9C).

At block 1916, the plurality of pixel groups may include linear pixel groups. Estimating the module size may include generating a histogram of lengths of linear pixel groups and estimating the module size using at least one reference scale of the generated histogram (e.g., as described in conjunction with FIG. 9D).

At block 1920, the processing device performing method 1900 may rescale the BI based on the estimated module size. At block 1930, method 1900 may include processing the rescaled BI using a neural network (NN) to obtain candidate locations of modules in the BI and a map of binarized pixel intensities of the BI (e.g., as described in conjunction with FIG. 12). The rescaling (upscaling or downscaling) of the BI may be performed in such a way that the new module size (in pixels) is equal (or approximately equal) to the size of the module of training barcode images that were previously used in training of the NN. In some implementations, the NN may be a convolutional NN having one or more dilation layers with exponential expansion of receptive field (e.g., as described in conjunction with FIG. 10).

At block 1940, method 1900 may include identifying associations of grid positions in a grid of modules (GoM) with the candidate locations of modules in the BI. In some implementations, an association of each of at least a subset of the grid positions in the GoM may be identified based on one or more associations identified for other grid positions in the GoM (e.g., as described in conjunction with FIG. 11). In some implementations, identifying associations of grid positions in the GoM with the candidate locations of modules may include one or more operations of the middle callout section of FIG. 19. More specifically, at block 1942, method 1900 may include identifying a first association of a first grid position in the GoM with a first candidate location and identifying a second association of a second grid position in the GoM with a second candidate location. For example, the first grid position and the second grid position may belong to the same column or the same row of the GoM. In some instances, the first grid position and the second grid position may be adjacent (e.g., nearest neighbor) positions in the GoM. At block 1944, method 1900 may include identifying a third association of a third grid position in the GoM with a third candidate location. In some implementations, the first grid position, the second grid position and the third grid position may belong to the same row of the GoM or the same column of the GoM. The third grid position may be identified in view of the estimated module size and a direction between the first grid position and the second grid position (e.g., as described in conjunction with FIG. 11). Other techniques of iterative crawling/tracking may be used to identify grid positions in the GoM. Some of the techniques may deploy a local greedy tracking algorithm.

In some instances, the operations of block 1942 and block 1944 may be sufficient to identify (map) the complete GoM. In some instances, the operations of block 1942 and block 1944 may identify (map) a portion of the GoM, e.g., lines and clusters of grid positions, while some of the remaining grid positions may still remain unidentified (unmapped). In such instances, identifying associations of grid positions in the GoM with the candidate locations of modules may include one or more operations of the bottom callout section of FIG. 19. In particular, identifying associations of grid positions in the GoM with the candidate locations of modules in the BI may include identifying, at block 1946, a first association of a first linear array of the grid positions in the GoM with a first set of candidate locations and identifying a second association of a second linear array of the grid positions in the GoM with a second set of candidate locations. The first linear array of the grid positions and the second linear array of the grid positions may be extending in a first direction, e.g., a horizontal direction or a vertical direction.

At block 1948, method 1900 may include identifying a relative arrangement, in the GoM, of the first array of the grid positions with the second array of the grid positions in view of a third set of candidate locations that is associated with a third linear array of the grid positions extending in a second direction. In some implementations, the third set of candidate locations may share at least one candidate location with the first set of candidate locations and at least one candidate location with the second set of candidate locations. For example, the first array and the second array may be horizontal arrays of grid positions and the third array may be a vertical array that intersects the first array and the second array.

In some implementations, method 1900 may include additional post-processing operations that may be performed after the GoM has been identified. More specifically, method 1900 may include identifying, using one or more reference patterns, a correspondence between the GoM and a barcode mask. The barcode mask may specify standard patterns (e.g., finder patterns, timing patterns, and the like) defined in the specification of the barcode type. Based on the identified correspondence, the processing device may eliminate one or more grid positions from the GoM or add one or more grid positions to the GoM. In some instances, post-processing operations may include rotating the GoM (e.g., to any angle that is a multiple of 90 degrees). At block 1950, method 1900 may continue with decoding the BI using the GoM and the map of binarized pixel intensities.

FIG. 20 is a flow diagram illustrating an example method 2000 of efficient and reliable decoding of stacked linear barcodes under unfavorable conditions, in accordance with some implementations of the present disclosure. At block 2010, a processing device performing method 2000 may obtain a BI of a stacked linear barcode. As illustrated in FIG. 15A, the stacked linear barcode may include symbols arranged in a plurality of columns and a plurality of rows. Each symbol may include a fixed number of modules. In some implementations, the stacked linear barcode may be a PDF417-type barcode. At block 2020, method 2000 may include estimating, based on geometric characteristics of the BI, a module width and a module height. The geometric characteristics of the BI may include any features of spatial arrangement of elements of the BI, e.g., lines or clusters of pixels of the BI. The fixed number of modules may include an edge module of a first color (e.g., a white module at the left edge of a PDF417 symbol) and an edge module of a second color (e.g., a black module at the right edge of a PDF417 symbol).

As illustrated with the top callout section in FIG. 20, in some implementations, estimating the module width and the module height may include the following operations. At block 2021, the processing device may apply a geometric transformation to the BI to reduce vertical perspective that may be present in the BI (e.g., using the Hough transform or any other suitable transformation). At block 2022, method 2000 may include identifying a plurality of column boundaries. For example, each of the plurality of column boundaries may be identified in view of a transition between a first vertical line of the first color and a second vertical line of the second color. The first vertical line (e.g., a line of white modules) and the second vertical line (e.g., a line of black modules) may extend across multiple rows of the plurality of rows (e.g., across multiple symbols stacked on top of each other). At block 2024, method 2000 may include determining a width of one or more columns of the plurality of columns using the identified plurality of column boundaries, e.g., by dividing a width of N columns by the number of modules that should be present (according to the barcode specification) in these columns.

As further illustrated in FIG. 20, determining the module height in the BI may include generating, at block 2026, a histogram of heights for a plurality of linear pixel groups (e.g., vertical pixel lines, as illustrated in FIG. 15B) and identifying, at block 2028, one or more maxima of the generated histogram of heights.

At block 2030, method 2000 may include processing, in view of the module height, the BI using a first neural network (NN) to obtain a mask of rows. The mask of rows may characterize spatial arrangement of the plurality of rows in the BI. In some implementations, the mask of rows may identify central regions of the one or more rows (e.g., as illustrated in more detail in conjunction with FIG. 16).

At block 2040, the processing device performing method 2000 may modify, using the mask of rows, horizontal alignment of one or more rows of the plurality of rows of the BI to obtain a realigned BI. As illustrated with the middle callout section in FIG. 20, in some implementations, modifying horizontal alignment of the one or more rows may include the following operations. At block 2042, method 2000 may include shifting at least a portion of the central regions of the one or more rows in a vertical direction. At block 2044, method 2000 may include rescaling the central regions along the vertical direction (e.g., as illustrated in FIG. 16E). At block 2046, method 2000 may include trimming the rescaled central regions using one or more horizontal cuts (e.g., as illustrated in FIG. 16F).

At block 2050, the processing device performing method 2000 may process, in view of the module width, the realigned BI to identify the symbols of the BI. Each symbol of the BI may be identified using a plurality of aggregated probabilities, each of the plurality of aggregated probabilities characterizing a likelihood that a reference symbol of a plurality of reference symbols matches a respective symbol of the BI. As illustrated with the bottom callout section in FIG. 20, in some implementations, processing the realigned BI to identify the symbols of the BI may include the following operations. At block 2052, method 2000 may include processing the realigned BI using a second NN to obtain, for each of the symbols, a map of probabilities (e.g., as illustrated in FIG. 17) predicting presence, in the realigned BI, of one of a plurality of candidate lines, each candidate line having one of a plurality of colors and one of a plurality of widths (e.g., in modules).

At block 2054, method 2000 may include determining, using the map of probabilities, a plurality of probability values. Each of the plurality of probability values may characterize a likelihood that a corresponding line of the plurality of lines of the reference symbol is present in the respective symbol (e.g., as illustrated by the channel probability map 1708 in FIG. 17). At block 2056, method 2000 may include computing, using the determined plurality of probability values, the respective aggregated probability. At block 2060, the processing device performing method 2000 may include decoding the BI using the identified symbols of the BI.

Figure 21:
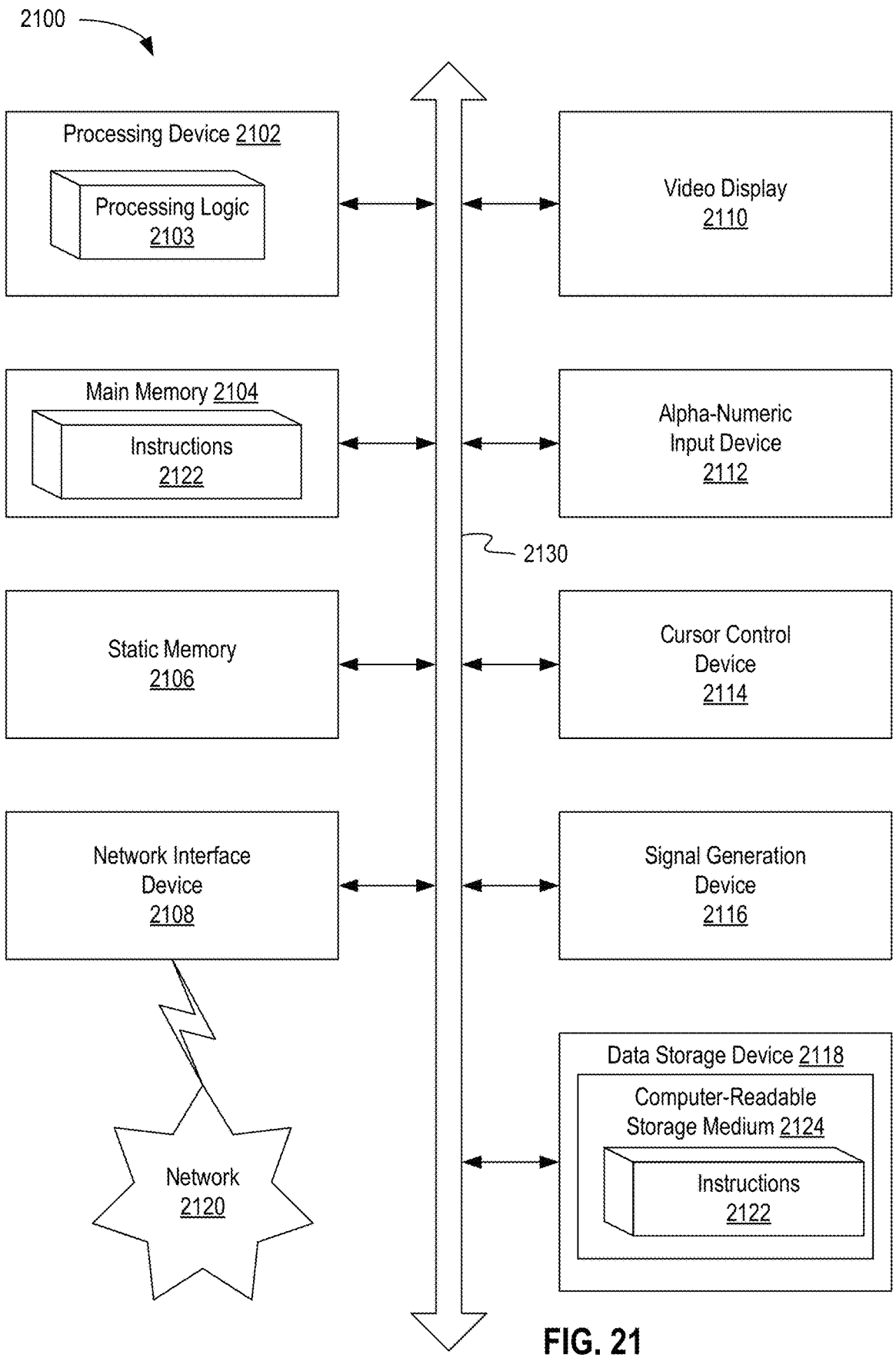
FIG. 21 depicts an example computer system that can perform any one or more of the methods described herein, in accordance with some implementations of the present disclosure.

FIG. 21 depicts an example computer system 2100 that can perform any one or more of the methods described herein, in accordance with some implementations of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 2100 includes a processing device 2102, a main memory 2104 (e.g., read-only memory (ROM), flash memory, dynamic random access memory (DRAM) such as synchronous DRAM (SDRAM)), a static memory 2106 (e.g., flash memory, static random access memory (SRAM)), and a data storage device 2116, which communicate with each other via a bus 2108.

Processing device 2102 (which can include processing logic 2103) represents one or more general-purpose processing devices such as a microprocessor, central processing unit, or the like. More particularly, the processing device 2102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2102 may also be one or more special-purpose processing devices such as an application specific integrated circuit (ASIC), a field programmable gate array (FPGA), a digital signal processor (DSP), network processor, or the like. The processing device 2102 is configured to execute instructions 2122 for implementing the module estimation engine 111, decoding engine 115, and/or training engine 152 of FIG. 1 and to perform the operations discussed herein (e.g., methods 1800-2000 of FIGS. 18-20).

The computer system 2100 may further include a network interface device 2108. The computer system 2100 also may include a video display unit 2110 (e.g., a liquid crystal display (LCD) or a cathode ray tube (CRT)), an alphanumeric input device 2112 (e.g., a keyboard), a cursor control device 2114 (e.g., a mouse), and a signal generation device 2116 (e.g., a speaker). In one illustrative example, the video display unit 2110, the alphanumeric input device 2112, and the cursor control device 2114 may be combined into a single component or device (e.g., an LCD touch screen).

The data storage device 2118 may include a computer-readable storage medium 2124 on which is stored the instructions 2122 embodying any one or more of the methodologies or functions described herein. The instructions 2122 may also reside, completely or at least partially, within the main memory 2104 and/or within the processing device 2102 during execution thereof by the computer system 2100, the main memory 2104 and the processing device 2102 also constituting computer-readable media. In some implementations, the instructions 2122 may further be transmitted or received over a network via the network interface device 2108.

While the computer-readable storage medium 2124 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "of" rather than an exclusive "of". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
   estimating a module size of a barcode image (BI);
   rescaling the BI based on the estimated module size;
   processing the rescaled BI to obtain candidate locations of modules in the BI and a representation of pixel intensities of the BI;
   identifying associations of grid positions in a grid of modules (GoM) with the candidate locations of modules in the BI, wherein an association of each of at least a subset of the grid positions in the GoM is identified based on one or more associations identified for other grid positions in the GoM; and
   decoding the BI, using the GoM and the representation of pixel intensities.

2. The method of claim 1, wherein estimating the module size of the BI is based on geometric characteristics of a plurality of pixel groups, wherein an individual pixel group of the plurality of pixel groups comprises one or more connected pixels of at least one of a first color or a second color.

3. The method of claim 2, wherein the plurality of pixel groups comprises one or more single-pixel groups, and wherein estimating the module size comprises:
determining the module size based on one or more dimensions of at least one pixel group of the one or more single-pixel groups.

4. The method of claim 2, wherein the plurality of pixel groups comprises one or more reference patterns in the BI, and wherein estimating the module size comprises:
determining the module size based on one or more dimensions of the one or more reference patterns in the BI.

5. The method of claim 2, wherein the plurality of pixel groups comprises a plurality of linear pixel groups, and wherein estimating the module size comprises:
generating a histogram of dimensions of the plurality of linear pixel groups; and
estimating the module size using at least one reference scale of the generated histogram.

6. The method of claim 1, wherein processing the rescaled BI to obtain the candidate locations of modules in the BI comprises using a neural network (NN).

7. The method of claim 1, wherein identifying associations of grid positions in the GoM with the candidate locations of modules in the BI comprises:
identifying a first association of a first grid position in the GoM with a first candidate location;
identifying a second association of a second grid position in the GoM with a second candidate location; and
identifying, using the estimated module size and a direction between the first grid position and the second grid position, a third association of a third grid position in the GoM with a third candidate location.

8. The method of claim 1, wherein identifying associations of grid positions in the GoM with the candidate locations of modules in the BI comprises:
identifying a first association of a first array of the grid positions in the GoM with a first set of the candidate locations;
identifying a second association of a second array of the grid positions in the GoM with a second set of the candidate locations, wherein the first array of the grid positions and the second array of the grid positions are extending in a first direction; and
identifying a relative arrangement, in the GoM, of the first array of the grid positions with the second array of the grid positions in view of a third set of the candidate locations that is associated with a third array of the grid positions extending in a second direction, wherein the third set of the candidate locations shares at least one candidate location with the first set of candidate locations and at least one candidate location with the second set of candidate locations.

9. The method of claim 1, wherein the representation of pixel intensities of the BI is obtained by determining, for an individual pixel of a plurality of pixels of the BI, a probability that the individual pixel is associated with at least one of a first color or a second color.

10. A method comprising:
obtaining a barcode image (BI) of a barcode comprising symbols arranged in a plurality of columns and a plurality of rows, wherein each symbol comprises multiple modules;
estimating, using the BI, a module width and a module height;
modifying, using the module height, an alignment of one or more rows of the plurality of rows of the BI to obtain a realigned BI;
processing, using the module width and a plurality of reference symbols, the realigned BI to identify the symbols of the BI; and
decoding the BI using the identified symbols of the BI.

11. The method of claim 10, wherein modifying the alignment of the one or more rows comprises:
processing the BI using a neural network to obtain a mask of rows, wherein the mask of rows characterizes spatial arrangement of the plurality of rows in the BI; and
using the mask of rows to modify the alignment of the one or more rows.

12. The method of claim 11, wherein modifying the alignment of the one or more rows comprises:
shifting, in a vertical direction, at least a portion of an individual row of the one or more rows;
rescaling the shifted portion of the individual row; and
trimming the rescaled shifted portion of the individual row.

13. The method of claim 10, wherein estimating the module width comprises:
identifying a plurality of column boundaries, wherein each of the plurality of column boundaries is identified based on a transition between a first line of a first color and a second line of a second color, wherein the first line and the second line extend across multiple rows of the plurality of rows; and
determining a width of one or more columns of the plurality of columns using the identified plurality of column boundaries.

14. The method of claim 13, further comprising:
applying, prior to identifying the plurality of column boundaries, a geometric transformation to the BI to reduce vertical perspective of the BI.

15. The method of claim 10, wherein estimating the module height comprises:
generating a histogram of heights for a plurality of linear pixel groups of the BI; and
identifying one or more maxima of the histogram of heights.

16. The method of claim 10, wherein each symbol of the BI is identified using one or more aggregated probabilities, an individual aggregated probability characterizing a likelihood that a reference symbol of the plurality of reference symbols matches a respective symbol of the BI.

17. The method of claim 10, wherein processing the realigned BI to identify the symbols of the BI comprises:
processing, using a neural network, the realigned BI to obtain, for an individual symbol, a set of probabilities predicting presence, in the realigned BI, of one of a plurality of candidate lines, each candidate line having one of a plurality of colors and one of a plurality of widths.

18. The method of claim 17, wherein processing the realigned BI to identify the symbols of the BI further comprises:
determining, using the set of probabilities, a plurality of likelihood values, wherein an individual likelihood value of the plurality of likelihood values characterizes a likelihood that a corresponding line of a plurality of lines of a reference symbol is present in the respective symbol; and identifying the individual symbol using the plurality of likelihood values.

19. A system comprising:

a memory; and a processing device operatively coupled to the memory, the processing device to:

estimate a module size of a first barcode image (BI);

rescaling the first BI based on the estimated module size;

process the rescaled first BI to obtain candidate locations of modules in the BI and a representation of pixel intensities of the first BI;

identify associations of grid positions in a grid of modules (GoM) with the candidate locations of modules in the first BI, wherein an association of each of at least a subset of the grid positions in the GoM is identified based on one or more associations identified for other grid positions in the GoM; and decode the first BI, using the GoM and the representation of pixel intensities.

20. The system of claim 19, wherein the processing device is further to:

obtain a second barcode image (BI) of a barcode comprising symbols arranged in a plurality of columns and a plurality of rows, wherein each symbol comprises multiple modules;

estimate, using the second BI, a module width and a module height;

modify, using the module height, an alignment of one or more rows of the plurality of rows of the second BI to obtain a realigned second BI;

processing, using the module width and a plurality of reference symbols, the realigned second BI to identify the symbols of the second BI; and decoding the BI using the identified symbols of the second BI.

* * * * *